(12) United States Patent
Collet et al.

(10) Patent No.: US 12,459,845 B1
(45) Date of Patent: Nov. 4, 2025

(54) APPARATUS FOR WATER FILTRATION, OZONE, AND ULTRAVIOLET DISINFECTION

(71) Applicants: Corbin Collet, Portage, MI (US); Brian Brandon, Bellevue, MI (US)

(72) Inventors: Corbin Collet, Portage, MI (US); Brian Brandon, Bellevue, MI (US)

(73) Assignee: Blu Technology LLC, Portage, MI (US)

( * ) Notice: Subject to any disclaimer, the term of this patent is extended or adjusted under 35 U.S.C. 154(b) by 584 days.

(21) Appl. No.: 17/847,855

(22) Filed: Jun. 23, 2022

Related U.S. Application Data

(60) Provisional application No. 63/248,687, filed on Sep. 27, 2021, provisional application No. 63/213,793, filed on Jun. 23, 2021.

(51) Int. Cl.
| | |
|---|---|
| *C02F 9/20* | (2023.01) |
| *B01D 29/56* | (2006.01) |
| *C02F 1/00* | (2023.01) |
| *C02F 1/32* | (2023.01) |
| *C02F 1/78* | (2023.01) |
| *E03C 1/01* | (2006.01) |
| *E03C 1/122* | (2006.01) |
| *C02F 103/00* | (2006.01) |

(52) U.S. Cl.
CPC ............... *C02F 9/20* (2023.01); *B01D 29/56* (2013.01); *C02F 1/003* (2013.01); *C02F 1/325* (2013.01); *C02F 1/78* (2013.01); *E03C 1/01* (2013.01); *E03C 1/1222* (2013.01); *B01D 2201/184* (2013.01); *C02F 2103/002* (2013.01); *C02F 2103/005* (2013.01); *C02F 2201/005* (2013.01); *C02F 2201/007* (2013.01); *C02F 2201/009* (2013.01); *C02F 2201/326* (2013.01); *C02F 2209/40* (2013.01); *C02F 2209/42* (2013.01)

(58) Field of Classification Search
CPC .. C02F 9/20; C02F 1/003; C02F 1/325; C02F 1/78; B01D 29/56; E03C 1/01; E03C 1/1222
See application file for complete search history.

(56) References Cited

U.S. PATENT DOCUMENTS

| | | | | |
|---|---|---|---|---|
| 5,056,544 A | * | 10/1991 | Stevens | ................... B60R 15/00 134/96.1 |
| 6,855,897 B1 | * | 2/2005 | Dorward | ................ H01H 35/40 73/239 |

(Continued)

*Primary Examiner* — Chester T Barry
(74) *Attorney, Agent, or Firm* — Gardner, Linn, Burkhart & Ondersma LLP

(57) ABSTRACT

A filtration system that includes a coarse filter, a fine filter, and a pump. The coarse filter filters out sediment from water passing through the coarse filter. The fine filter filters out foreign material larger than a selected pore size. The pump pumps water when a DC voltage is applied to the fluid pump. The pump is in-line with and coupled to the coarse filter and the fine filter such that water is drawn into or pushed into the coarse filter and/or the fine filter. The filtration system includes inlet and outlet connectors, the inlet connector directly coupled to the coarse filter to receive water into the coarse filter and the outlet connector directly coupled to the fine filter to output filtered water received from the fine filter. A power source is coupled to the fluid pump and outputs the DC voltage applied to the fluid pump.

19 Claims, 20 Drawing Sheets

(56) References Cited

U.S. PATENT DOCUMENTS

| | | |
|---|---|---|
| 8,481,985 B2 | 7/2013 | Neister |
| 8,753,575 B2 | 6/2014 | Neister |
| 8,975,605 B2 | 3/2015 | Neister |
| 9,700,642 B2 | 7/2017 | Neister |
| 10,398,000 B2 | 8/2019 | Rantala |
| 2006/0164223 A1* | 7/2006 | Gilbert .................. H02J 9/002 307/10.6 |
| 2007/0046114 A1* | 3/2007 | Kondo .................. H02K 11/05 257/E23.102 |
| 2008/0023412 A1* | 1/2008 | Holt ....................... C02F 3/288 210/241 |
| 2008/0314807 A1* | 12/2008 | Junghanns ........... B01D 61/025 210/85 |
| 2013/0036539 A1* | 2/2013 | Zahir ..................... E03B 7/074 4/227.1 |
| 2013/0269411 A1* | 10/2013 | Selman ............. G01N 33/0006 95/266 |
| 2017/0227453 A1* | 8/2017 | Scipolo ................. G01N 21/05 |
| 2018/0353629 A9 | 12/2018 | Neister et al. |
| 2018/0354432 A1* | 12/2018 | Van Beek ............... B60R 15/00 |
| 2019/0319650 A1* | 10/2019 | Gu ....................... H04W 16/26 |
| 2020/0030469 A1 | 1/2020 | Neister et al. |
| 2020/0231480 A1* | 7/2020 | Hall ......................... C02F 9/00 |
| 2023/0219507 A1* | 7/2023 | Fischer ................... C02F 1/52 210/710 |
| 2023/0303015 A1* | 9/2023 | Slezak .................. B60R 15/00 |
| 2023/0314391 A1* | 10/2023 | Millar ............... G01N 33/0022 422/98 |

* cited by examiner

APPARATUS FOR WATER FILTRATION, OZONE, AND ULTRAVIOLET DISINFECTION

CROSS REFERENCE TO RELATED APPLICATIONS

The present application claims the filing benefits of U.S. provisional application Ser. No. 63/213,793, filed Jun. 23, 2021, and Ser. No. 63/248,687, filed Sep. 27, 2021, which are hereby incorporated by reference herein in their entireties.

FIELD OF THE INVENTION

The present invention is directed to water filtration, and in particular, to portable water filtration.

BACKGROUND OF THE INVENTION

Conventional filtration, such as sediment filtering and finer micron filtering have been used to filter water of sand, sediment, contaminants, etc. Water filtration systems are typically used for whole house (multiple faucet) water filtration or for filtering water supplied to a single faucet. Other water filtration systems may be portable and optimized for size and weight allowing them to be carried along for use while hiking and/or camping.

SUMMARY OF THE INVENTION

Embodiments of the present invention provide a system and apparatus for filtering and disinfecting water. The filter/disinfection system includes a filtering apparatus that includes at least one filter and a pump directly coupled together. The filter/disinfection system may optionally include a disinfection apparatus that includes a UV light fixture for disinfecting water as the water passes through the disinfection apparatus. The filter/disinfection system includes a controller for turning the pump ON and OFF. The controller also (when so equipped) selectively turns the UV light fixture ON and OFF. The controller controls the delivery of a DC voltage to the pump and the optional UV light fixture. The pump and UV light fixture may utilize a same voltage level, e.g., 12V DC. The DC voltage is drawn from a power source that is plugged into the filter/disinfection system. Optionally, the power source is a battery. Alternatively, the power source may be an AC-to-DC converter outputting a DC voltage. The power source outputs a current sufficient to power both the pump and the UV light fixture. The controller may turn ON the pump while leaving the UV light fixture OFF. The power source may also be coupled to a solar panel for charging. The use of a solar panel and battery allows for the portable use of the filter/disinfection system away from conventional power sources (i.e., off-grid). The battery may be recharged through the use of a recharging unit that receives power from a variety of power sources, e.g., AC voltage sources, DC voltage sources, and a solar panel.

In an aspect of the present invention, a filter/disinfection system includes a filtering apparatus and a disinfection apparatus. The filtering apparatus includes one or more filters and an electric pump configured to pump water when a DC voltage is applied to the pump. The one or more filters are configured to filter water that is drawn into the filter/disinfection system by the pump. The filters and the pump are directly coupled without intermediary fittings/couplings. The disinfection apparatus includes an ultraviolet (UV) light fixture that disinfects water as it passes through the disinfection apparatus. The disinfection apparatus is coupled to the output of the filtering apparatus such that filtered water is fed to the disinfection apparatus. The filter/disinfection system also includes a controller for controlling the operation of the pump and the UV light fixture. The filter/disinfection system also includes a power port for coupling to a power source. The controller controls a supply of DC voltage via the power port to the pump and the UV light fixture.

In a further aspect of the present invention, the one or more filters are configured to filter water by preventing anything larger than a selected pore size of the filter from passing through the filter. The one or more filters may include a coarse filter configured to remove sand/sediment from the water passing through the coarse filter. The one or more filters may include a charcoal filter for improved water taste. The one or more filters may also include a pre-filter at a water inlet. The one or more filters may also include a fine filter with filter pores of 0.2-micron or smaller in diameter.

In another aspect of the present invention, the DC voltage is 12 VDC. The power source may be a battery or an AC-to-DC converter. The power source is coupled to the power port via a power cable. Optionally, the power source is selectively coupled to a solar panel for charging the power source. The filter/disinfection system may also be mobile and powered via a portable battery. The portable battery may be attachable to the filter/disinfection system.

In an aspect of the present invention, the UV light source is an LED ultraviolet source configured to emit ultraviolet light. The LED UV light source may also emit UVC light.

In yet another aspect of the present invention, the ultraviolet source includes one or more mercury vapor ultraviolet lamp fixtures.

Thus, a mobile filter/disinfection system, powered by a low voltage DC power source may be provided for filtering and disinfecting any available water source. The filter/disinfection system includes one or more filters and an optional UV light fixture. The one or more filters are configured to filter the water to a desired level of filtration. The UV light fixture is configured to disinfect the filtered water output by the one or more filters. The pump is configured to draw water from an available source and through the filter/disinfection system.

In another aspect of the present invention, a water filtration system may include any number of components. Exemplary components include one or more water filters, water pump, water disinfection apparatus, water tank, water heater, and water chiller. The components may be arranged in any configuration to include or omit any of the components.

These and other objects, advantages, purposes, and features of the present invention will become apparent upon review of the following specification in conjunction with the drawings.

DESCRIPTION OF THE PREFERRED EMBODIMENTS

Figure 1:
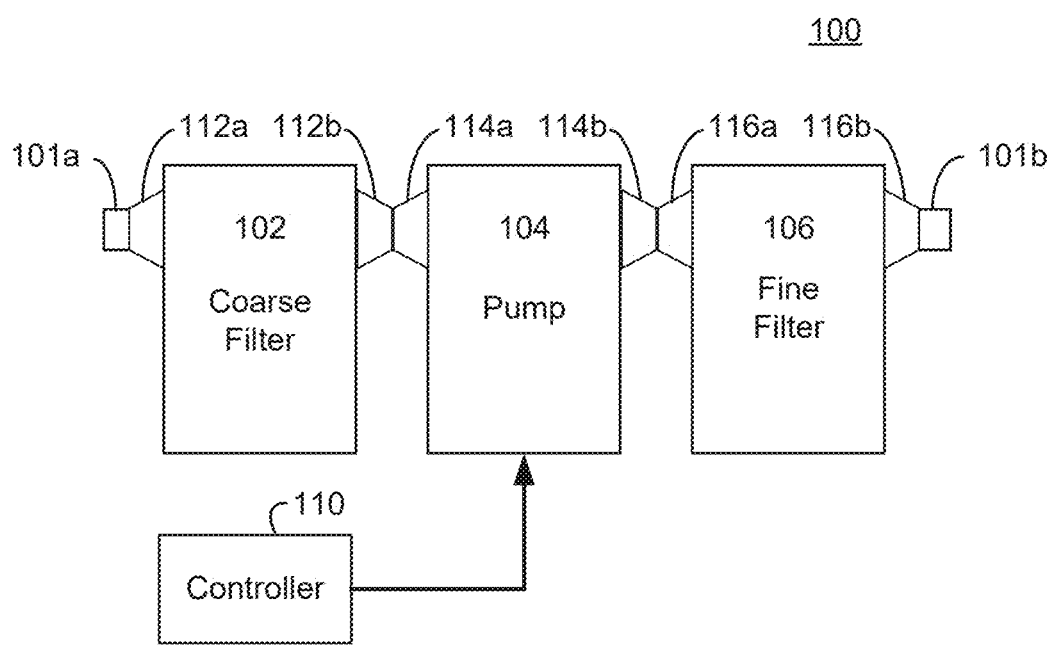
FIG. 1 is a block diagram of an exemplary water filtration system for filtering water drawn into the water filtration system by a pump in accordance with the present invention.

Referring to the drawings and the illustrative embodiments depicted therein, a mobile filter/disinfecting system provides mobile water filtering and disinfection. The mobile filter/disinfecting system is powered via a low-voltage DC power source. The filter/disinfecting system includes a filter apparatus that includes one or more filters and a fluid pump. The one or more filters filter water that is drawn into the filter apparatus by the fluid pump. The filters and pump are directly coupled (without the use of intermediary fittings/couplings), and with quick-connect inlet/outlet fittings also directly coupled to the filters. The filter/disinfecting system also includes a disinfection apparatus that includes an ultraviolet (UV) light source configured for disinfecting the filtered water as the filtered water passes through the disinfection apparatus. The UV light source may include light emitting diodes (LEDs) configured to emit ultraviolet light. The UV light source may be configured to emit UV-C light or ambient light. The filter/disinfecting apparatus includes a control module that controls the operation of the fluid pump and the optional UV light source. The control module turns the fluid pump ON and OFF, as well as turning the UV light source ON and OFF (via a flow switch). The filter/disinfecting system also includes a power port for coupling the filter/disinfecting apparatus to a power source via a power cable. The power source may be a battery or optionally an AC-to-DC converter. Pairing the filter/disinfecting system to a battery allows the system to be a portable system that can be used where a filtered and disinfected water supply is needed, regardless of available power sources. Optionally, the filter/disinfecting system may be fitted with a housing fixture allowing it to be temporarily mounted for long-term use in a recreational vehicle or a residential structure, or other buildings where a supply of filtered and disinfected water is needed or desired. Thus, the filter/disinfecting system may be incorporated into a vehicle, structure, or configured as a portable standalone unit.

FIG. 1 illustrates the components of an exemplary filter apparatus 100. As illustrated in FIG. 1, a pair of filters 102, 106, with a fluid pump 104 between them, are directly coupled. An output 112b of filter 102 directly couples to an input 114a of fluid pump 104, while an output 114b of fluid pump 104 directly couples to an input 116a of filter 106. Note that an inlet 101a is directly coupled to an input 112a of filter 102, while an outlet 101b is directly coupled to an output 116b of filter 106. Note that the inputs and outputs are not drawn to scale (see FIGS. 10A and 10B for examples of the direct couplings of filters and fluid pumps) but are enlarged for the sake of clarity. The inlet 101a and outlet 101b include quick-disconnect functionality for rapid and reliable coupling of hoses to the filter apparatus 100. As also illustrated in FIG. 1, a controller 110 is communicatively coupled to the fluid pump 104 and is configured to control the operation of the fluid pump 104. Via an ON/OFF switch that is communicatively coupled to the controller 110, a user turns the fluid pump ON and OFF as desired. Optionally, the controller 110 may also control the pumping rate of the fluid pump 104 via a throttle functionality. The filter apparatus 100 may also include fewer or more filters. While FIG. 1 illustrates the fluid pump 104 arranged in-line between the coarse filter 102 and the fine filter 106, the fluid pump 104 may be placed in-line before the filters 102, 106 and pushing water through the filters 102, 106, or in-line after the filters 102, 106 and drawing water into the filters 102, 106. As illustrated in FIG. 1, the filter apparatus 100 includes a coarse filter 102 configured to filter out sand/sediment before the water passes through the fluid pump 104 on the way to a fine filter 106. The fine filter may be a micron filter configured to prevent anything larger than the filter's-micron pores from passing through. Sub-micron filters may also be used, e.g., a 0.2-micron filter configured to filter out anything larger than 0.2 microns.

Figure 2A:
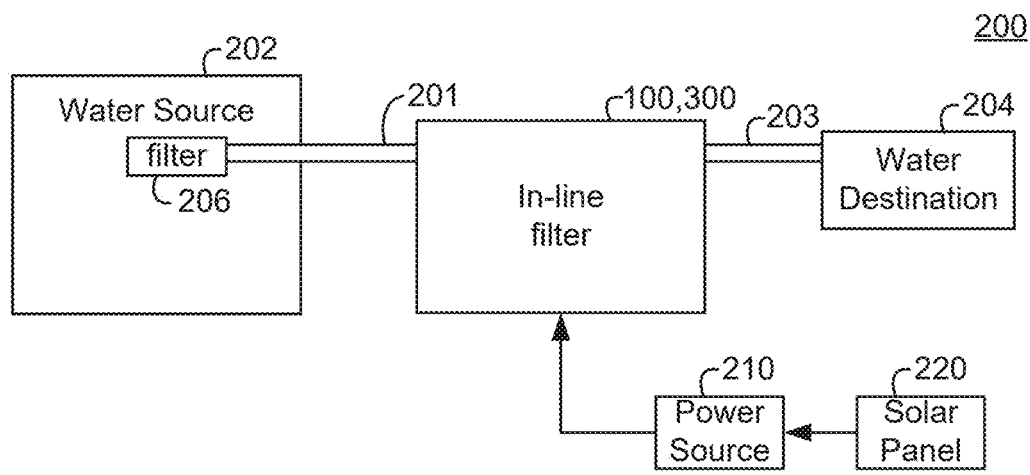
FIG. 2A is a block diagram of the water filtration system of FIG. 1 receiving power from a power source and solar panel such that a pump of the water filtration system drawn water from a source into the water filtration system for filtering in accordance with the present invention.
Figure 3:
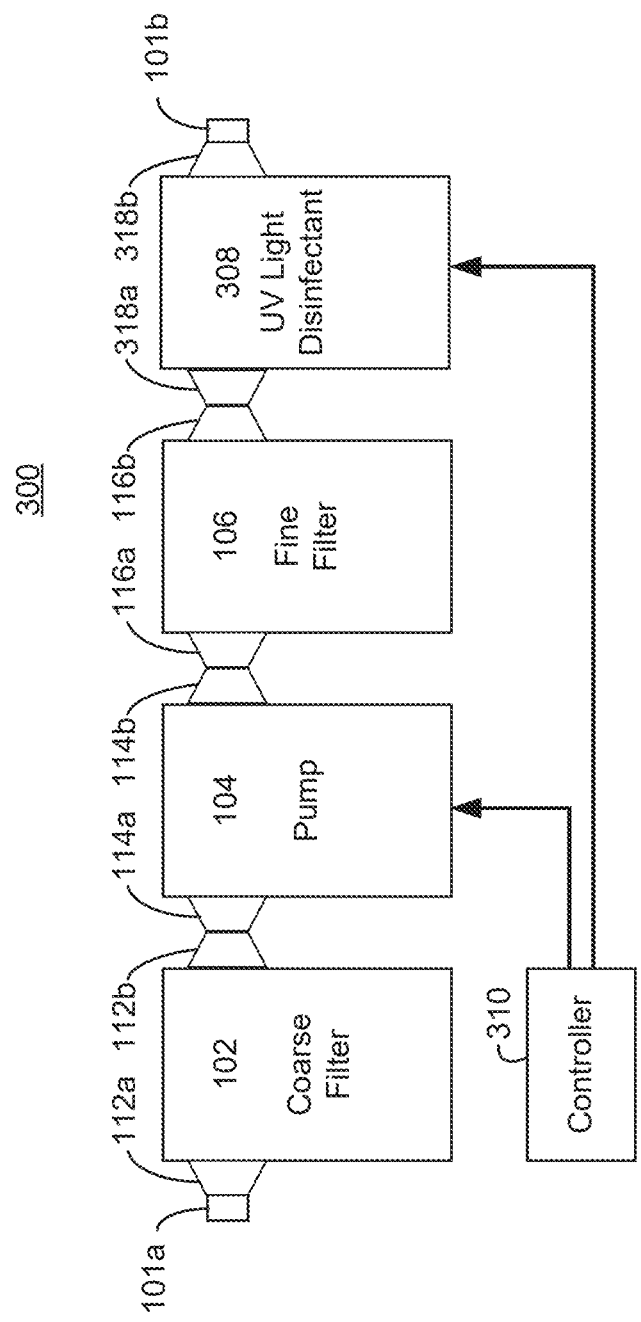
FIG. 3 is a block diagram of an exemplary water filter/disinfection system for filtering and disinfecting water drawn into the filter/disinfection system in accordance with the present invention.
Figure 17:
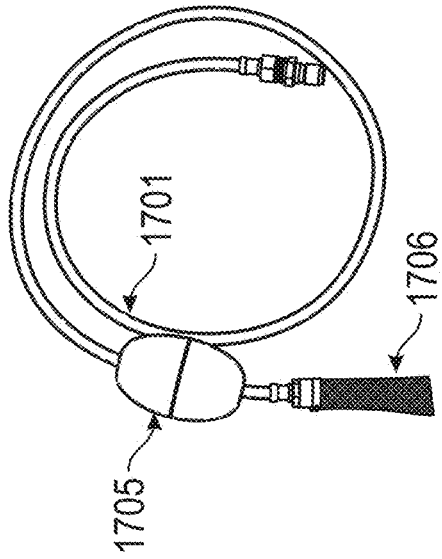
FIG. 17 is a perspective view of an exemplary inlet hose with prefilter and floatation device in accordance with the present invention.

FIG. 2A illustrates the filter apparatus 100 or the filter/disinfector apparatus 300 of FIG. 1 and FIG. 3 in operation. As illustrated in FIG. 2A, the filter apparatus 100 or filter/disinfector apparatus 300 is coupled to an inlet hose 201 and an outlet hose 203. The inlet hose 201 is placed into any available water supply 202 for filtering and/or disinfecting, while the outlet hose 203 is positioned to deliver filtered/disinfected water to a destination 204. The inlet hose 201 may optionally include an inlet filter 206 to filter out organic materials (vegetable matter, algae, etc.) The inlet hose 201 may further include a float or similar arrangement to aid in positioning the inlet filter 206 into the water for drawing water into the inlet hose 201 (keeping the inlet hose 201 from touching the bottom of a body of water). For example, FIG. 17 illustrates an exemplary inlet hose 1701 with an inlet filter 1706 on one end along with a float 1705 (keeping the inlet hose 1701 from touching the bottom of a body of water). The opposite end of the inlet hose 1701 includes a coupling for coupling to the water inlet 101a. Note also that a power source 210 is coupled to the filter apparatus 100 or the filter/disinfector apparatus 300. FIG. 2A also illustrated the use of an optional solar panel 220 that charges the power source 210 (battery). In one embodiment the power source 210 is a battery, in another embodiment, the power source 210 is an AC-to-DC converter coupled to an AC source. Whatever the source, the power source 210 is configured to output a low voltage DC, e.g., 12V DC. The power source 210 will be sufficient to power either the filter apparatus 100 or the filter/disinfector apparatus 300 (that is, both the fluid pump 104 and the disinfection apparatus 308). On average, the fluid pump 104 will output an average of 2.2 gallons per minute. The power source 210 will output a low voltage (e.g., 12 V DC) at 1.5 to 10 amps.

Figure 2B:
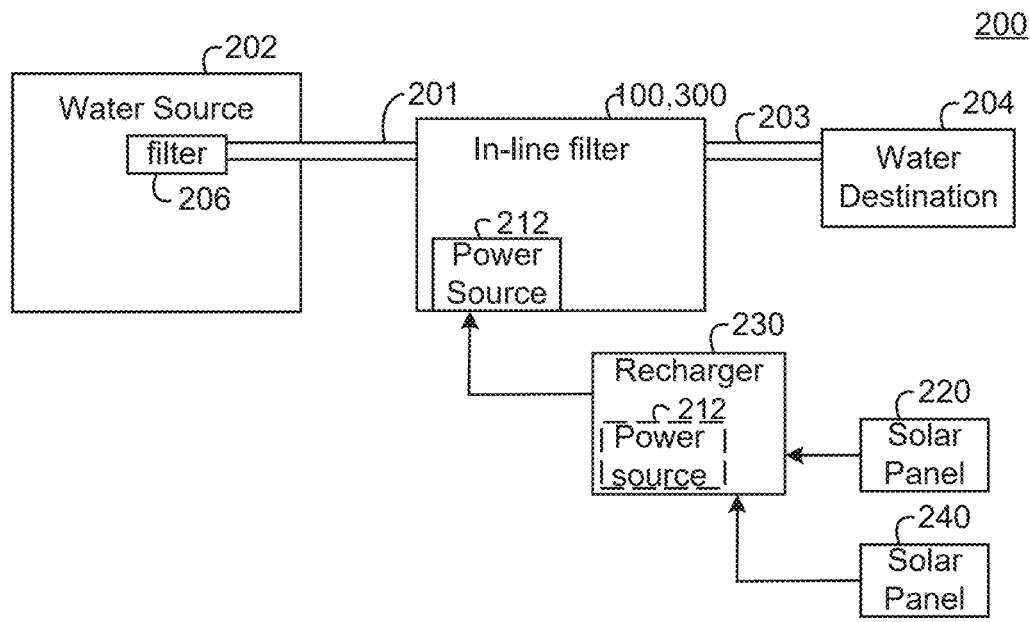
FIG. 2B is a block diagram of an alternative embodiment of the water filtration system of FIG. 2A incorporating a different battery and charging system in accordance with the present invention.
Figure 16A:
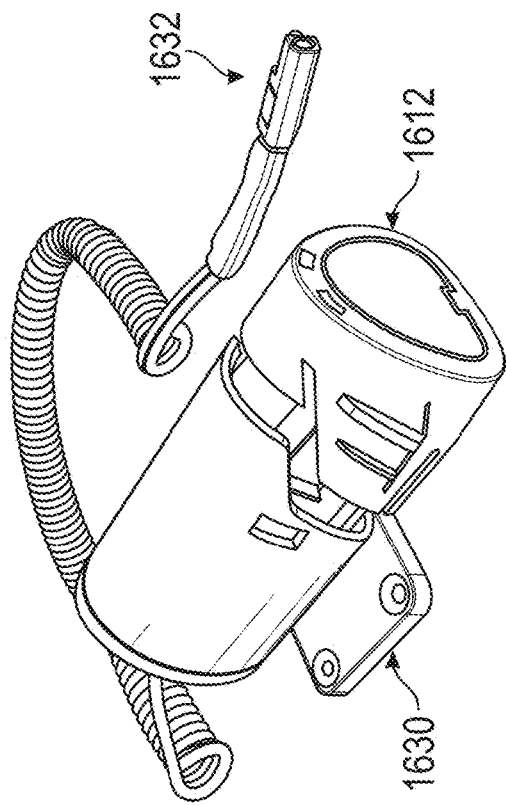
FIGS. 16A and 16B are different perspective views of an exemplary battery module for coupling the battery of FIG. 15 to a water filter system with an electrical interface in accordance with the present invention.
Figure 15:
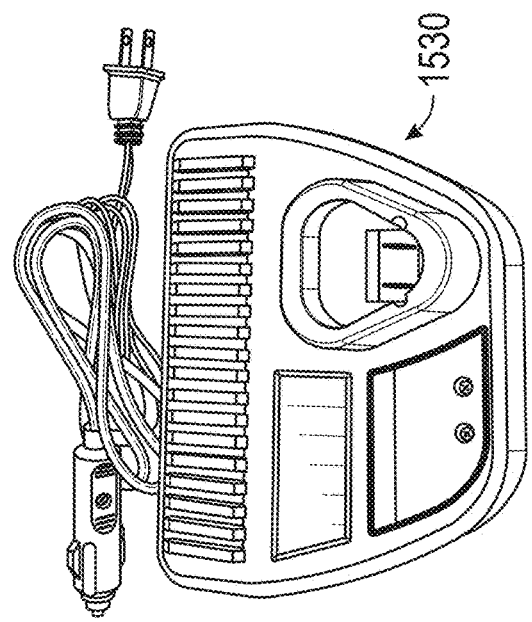
FIG. 15 is a perspective view of an exemplary AC/DC solar charger for charging a battery in accordance with the present invention.
Figure 16B:
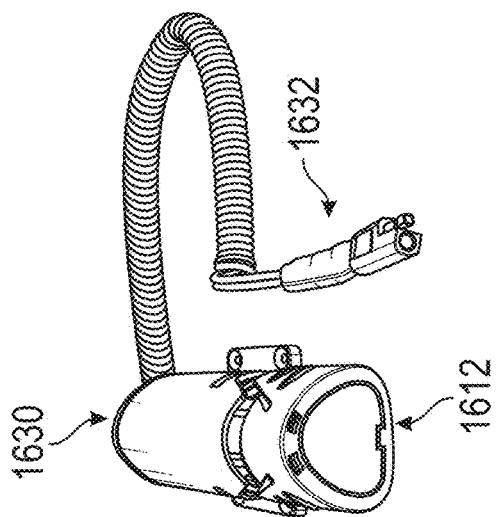
Figure 20:
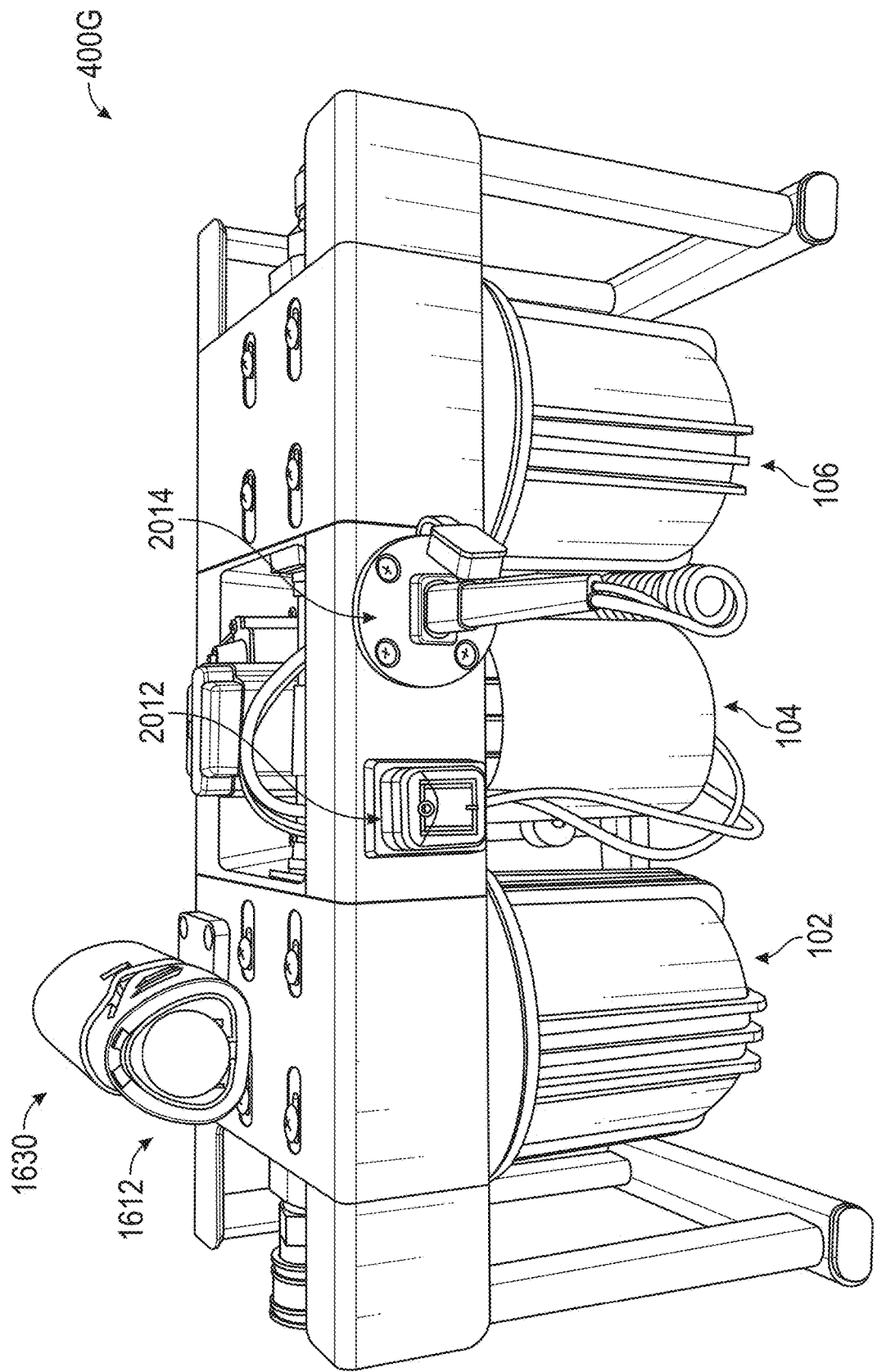
FIG. 20 is a perspective view of an exemplary water filter system with the battery module and battery of FIG. 16 in accordance with the present invention.

FIG. 2B illustrates an alternative embodiment of the filter arrangements of FIG. 2A. In FIG. 2B, the power source 210 of FIG. 2A is replaced with a power source 212 removable coupled into the housing of the filter apparatus 100, 300. In an aspect of the present embodiment, the removable power source 212 is a rechargeable battery 212. The rechargeable battery 212 may be either recharged (via a recharger 230) while still inserted into the filter apparatus 100, 300, or removed from the filter apparatus 100, 300 and inserted into a charging port of the recharger 230. For example, FIG. 15 illustrates an exemplary battery recharger 1530, which is configured to recharge a battery (e.g., a battery 1612 in FIGS. 16A and 16B). The battery recharger 1530 is an AC/DC recharger and is also configured to receive DC voltage from a solar panel. As illustrated in FIG. 20 and discussed herein, the battery 1612 may be inserted into a battery module 1630 for coupling (via a wiring harness 1632) the battery 1612 to a power receptacle of a filter apparatus 100, 300

FIG. 3 illustrates the components of an exemplary filter/disinfector apparatus 300. As illustrated in FIG. 1 and FIG. 3, the filter/disinfector apparatus 300 is the filter apparatus 100 with the addition of a disinfection apparatus 308. Similar to FIG. 1, where the filters 102, 106 and pump 104 are directly coupled together via their respective inputs and outputs, the input 318a of the disinfection apparatus 308 is directly coupled to the output 116b of filter 106, and with the outlet 101b directly coupled to the output 318b of the disinfection apparatus 308. Alternatively, the disinfection apparatus 308 may be coupled to the output 116b of filter 106 via a hose/conduit (not shown), and optionally with another hose/conduit coupling the output 318b of the disinfection apparatus 308 to the outlet 101b. FIG. 3 also illustrates a pair of control lines running from the controller 310 to the fluid pump 104 and the disinfection apparatus 308.

Figure 11:
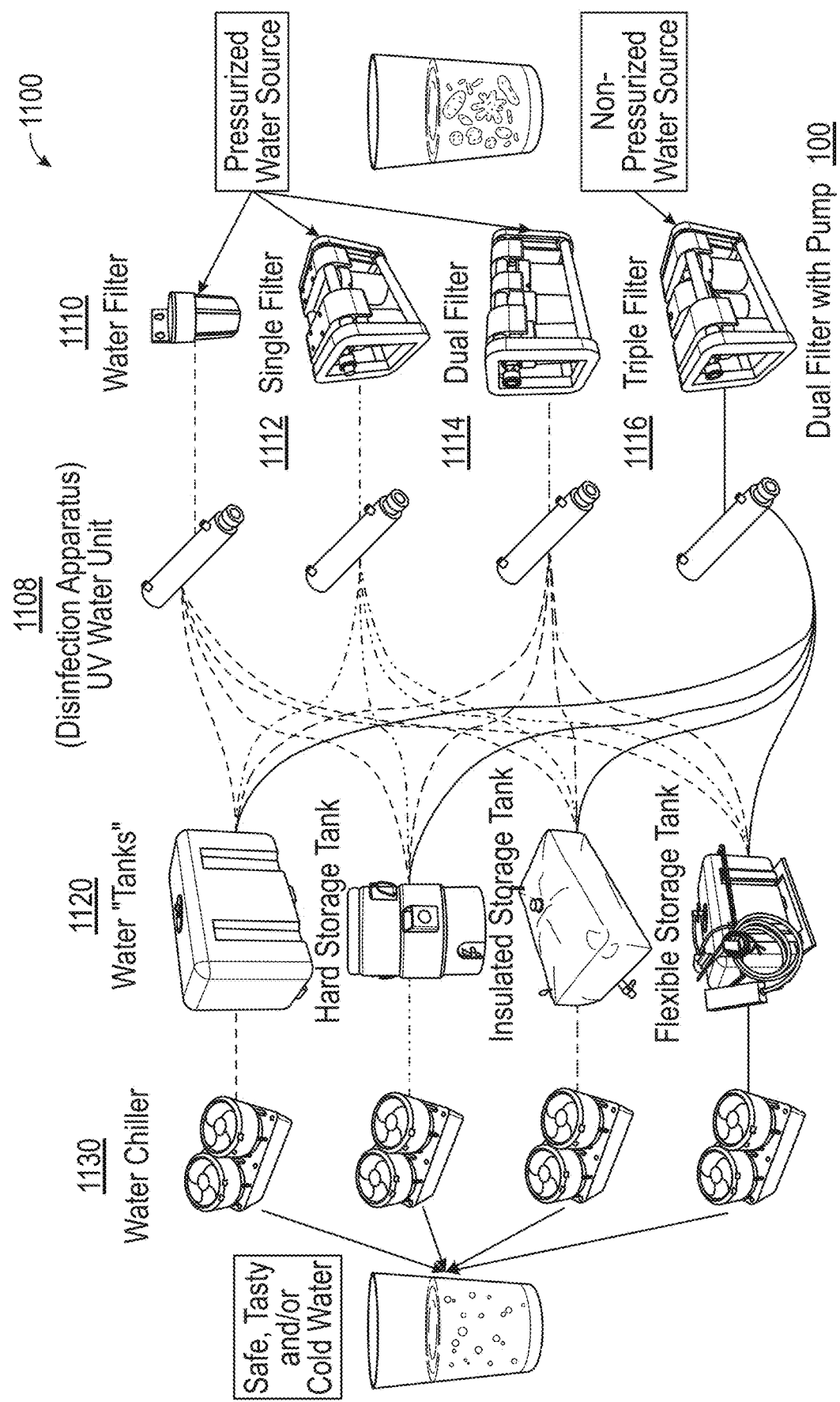
FIG. 11 is a perspective view of an exemplary water filter system illustrating a variety of different embodiments with optional disinfection apparatus, water tank, and water chiller in accordance with the present invention.

The filter/disinfector apparatus 300 operates in a similar fashion as discussed herein, with the added option of selective UV light disinfection (ON/OFF). The Disinfection apparatus 308 includes one or more UV lights. For example, the UV light may be provided by light emitting diodes (LEDs) that emit ultraviolet let. Optionally, other UV light fixtures may be used (e.g., mercury vapor lamp fixtures). The disinfection apparatus is powered by the same low voltage DC that powers the fluid pump 104, e.g., 12 V DC. While the disinfection apparatus 1108 of FIG. 11 is arranged in a narrow tube and with a variety of plumbing fittings on either end, the disinfection apparatus 308 of FIG. 3 is arranged within a housing similar to the filter housings of FIG. 3, such that the disinfection apparatus 308 is coupled in-line like the filters 102, 106 and fluid pump 104.

Figure 4A:
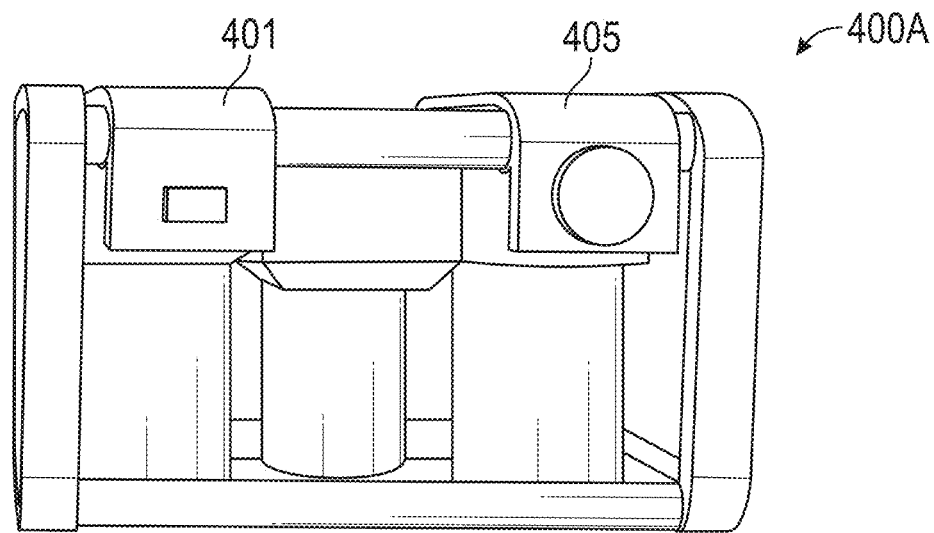
FIG. 4A is a perspective view of an exemplary water filter system mounted in a chassis in accordance with the present invention.
Figure 4B:
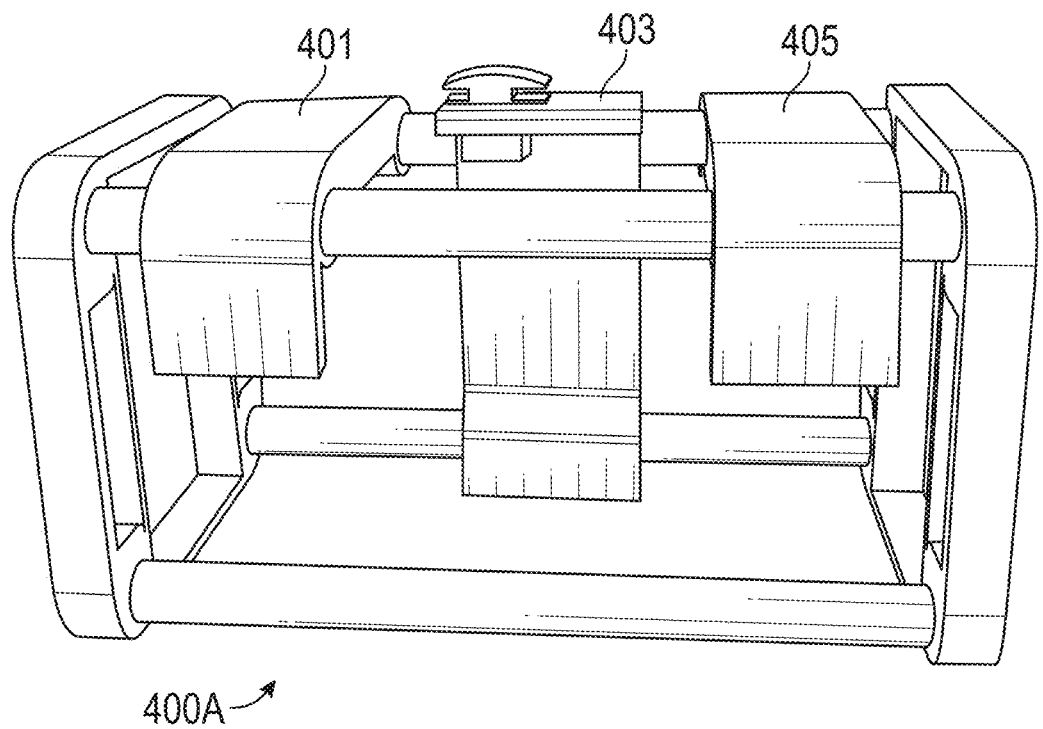
FIG. 4B is another perspective view of the chassis of FIG. 4A.
Figure 4C:
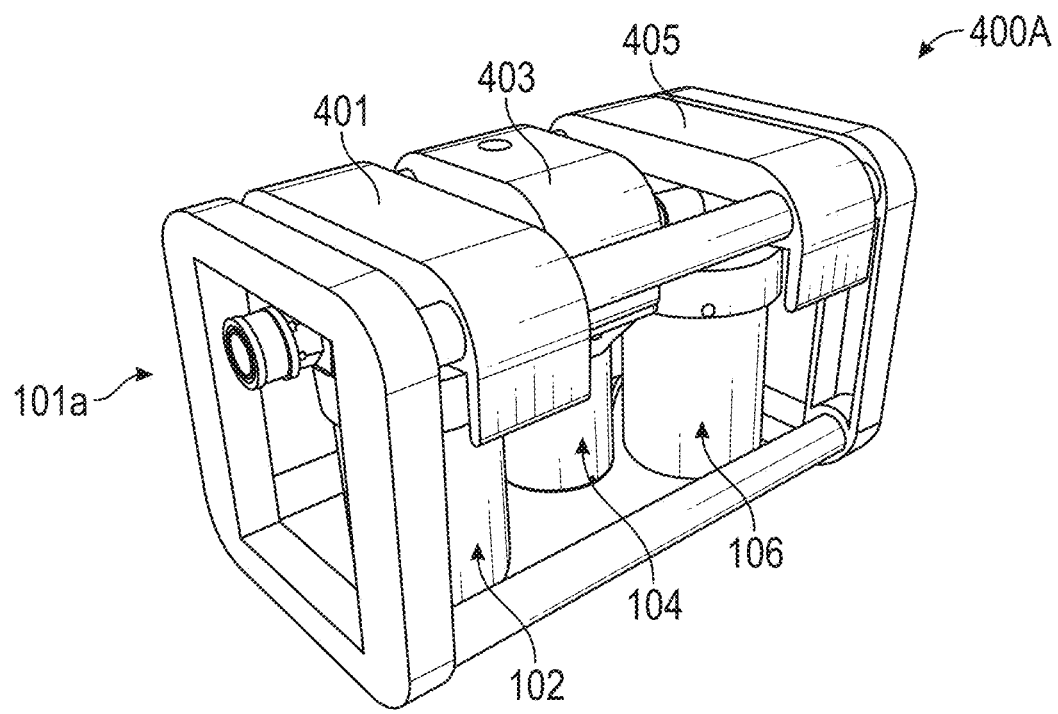
FIGS. 4C and 4D are perspective views of the chassis of FIG. 4A with an exemplary water filtration system in accordance with the present invention.
Figure 4D:
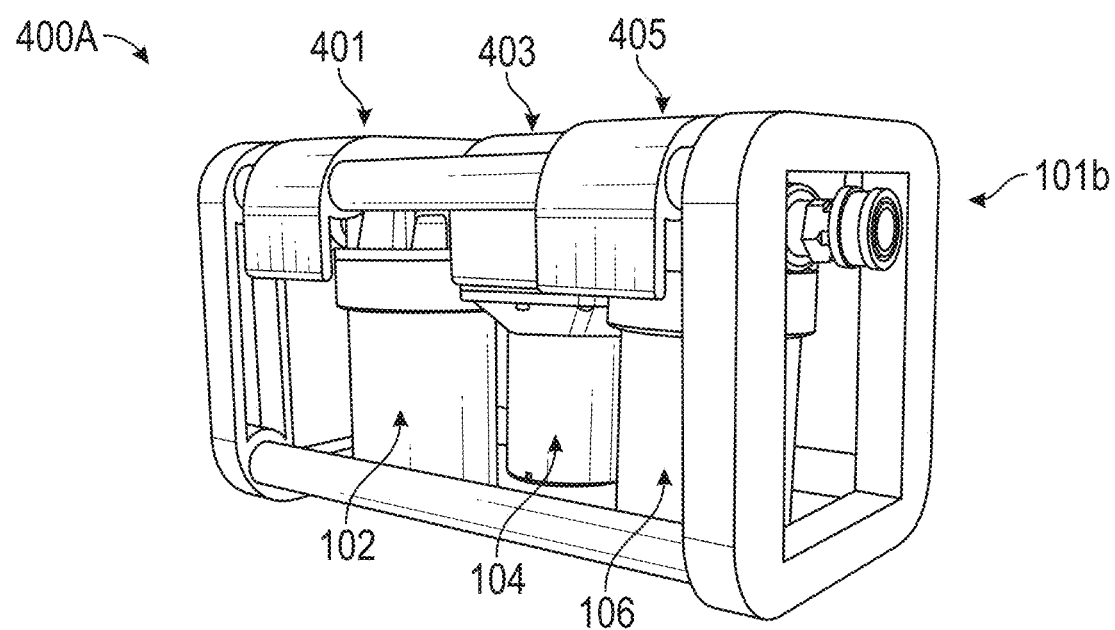

FIGS. 4A, 4B, 4C, 4D, 5, 6A, 6B, 6C, 8A, 8B, and 20-22 illustrate a variety of different fixtures, support brackets and chassis 400 for supporting the filter apparatus 100 or the filter/disinfector apparatus 300. FIGS. 4A and 4B illustrate a mounting chassis 400A that comprises mounting brackets 401, 405 for the filters 102, 106, as well as a bracket 403 for mounting the fluid pump 104. As illustrated in FIG. 4B, the filters 102, 106 are retained and supported in the chassis 400A from above (with the brackets 401, 405 configured to receive mounting bolts for securing the filters 102, 106 to their respective brackets 401, 405. As also illustrated in FIG. 4B, the fluid pump 104 is retained and supported in the chassis 400A from the side (with the bracket 403 configured to receive mounting bolts for securing the fluid pump 104 to the bracket 403). While not illustrated in FIGS. 4A and 4B, the chassis 400A may also include side panels as part of a housing. FIGS. 4C and 4D illustrate the brackets 401 and 405 securing filters 102 and 106 within the chassis 400, while bracket 403 is illustrated securing the fluid pump 104 within the chassis 400. FIGS. 4C and 4D also illustrate the placement of the inlet 101a and the outlet 101b on either side of the water filtration system 100. As discussed herein, the inlet 101a and outlet 101b are directly coupled to their respective filters 102, 106.

Figure 5:
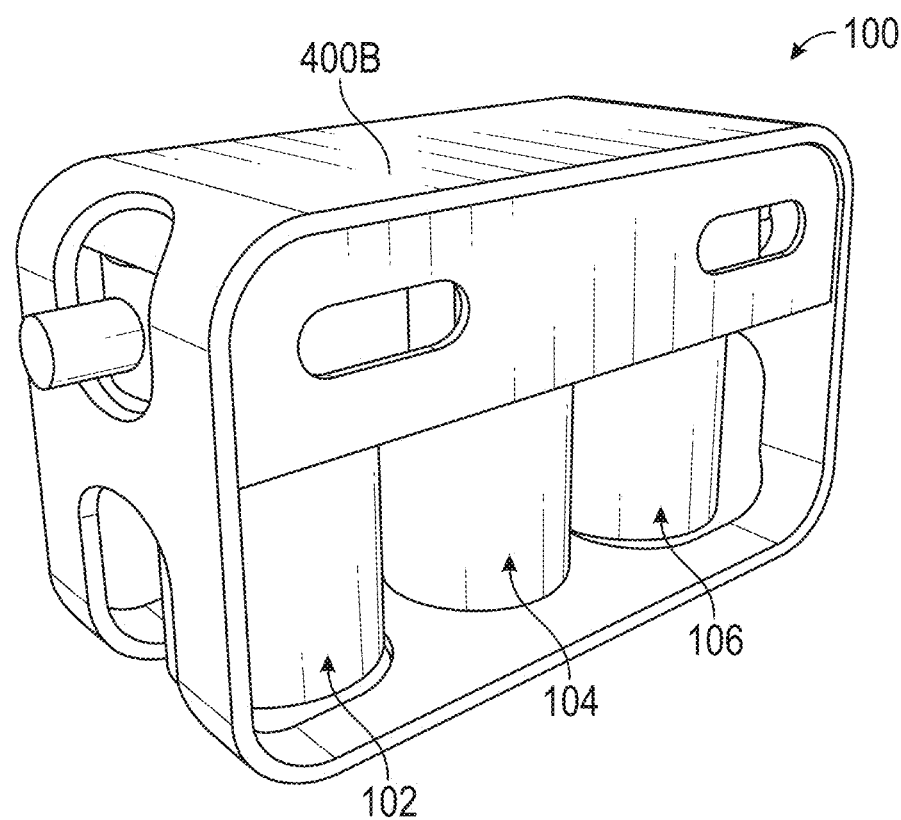
FIG. 5 is a perspective view of the exemplary water filter system mounted in a housing in accordance with the present invention.

FIG. 5 illustrates an exemplary housing 400B configured to retain and support the filters 102, 106 and fluid pump 104 of a filter apparatus 100. While not shown in FIG. 5, the housing 400B could also be used for retaining and supporting a filter/disinfector apparatus 300. The housing 400B also retains and supports a controller 110 for controlling the filters 102, 106 and fluid pump 104. The housing 400B may also include a control panel (not shown), that is communicatively coupled to the controller 110, allowing a user to control the operation of the filter apparatus 100. The housing 400B also includes a power port so that a power source 210 may be coupled to the filter apparatus 100 (see FIG. 7).

Figure 6A:
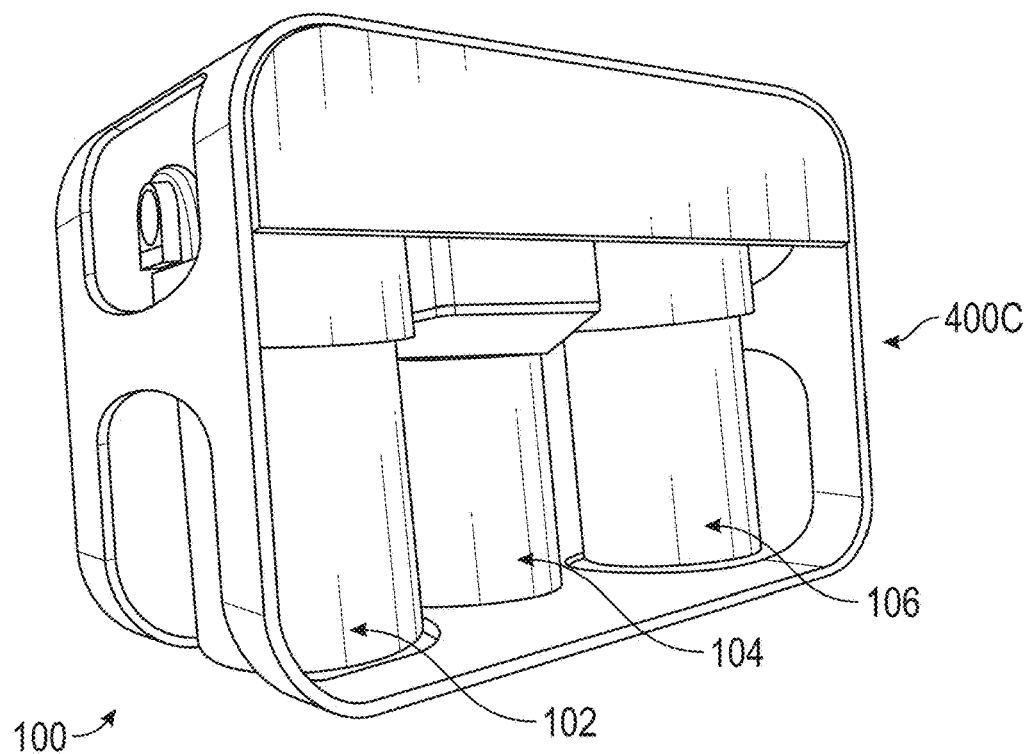
FIGS. 6A-6C are perspective views of an exemplary water filter system mounted in an alternative housing in accordance with the present invention.
Figure 6B:
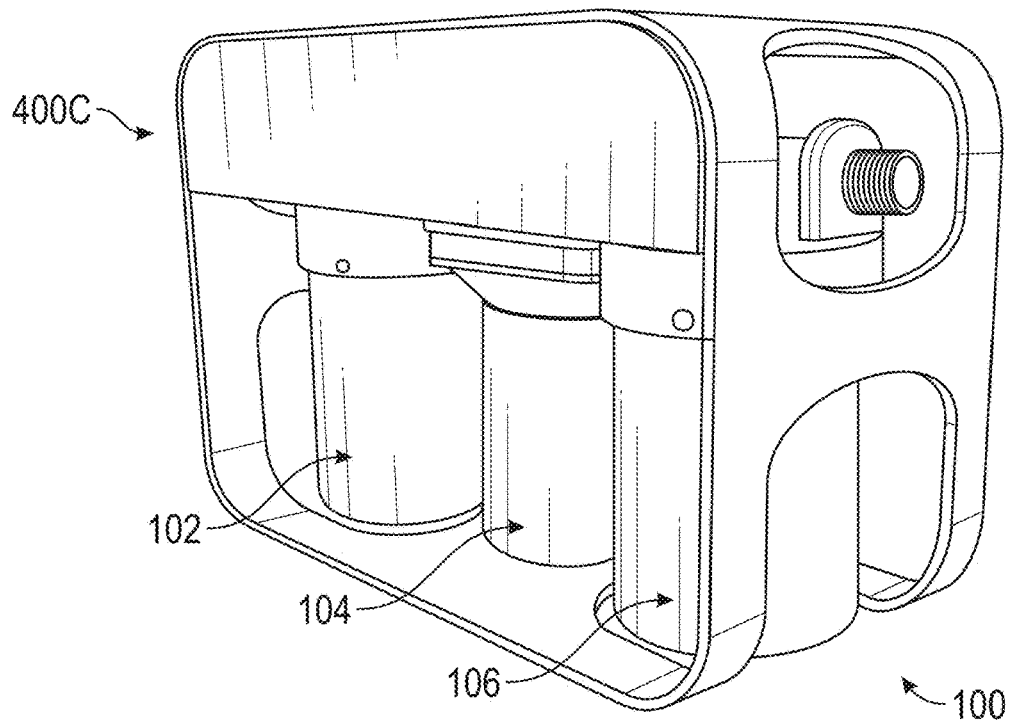
Figure 6C:
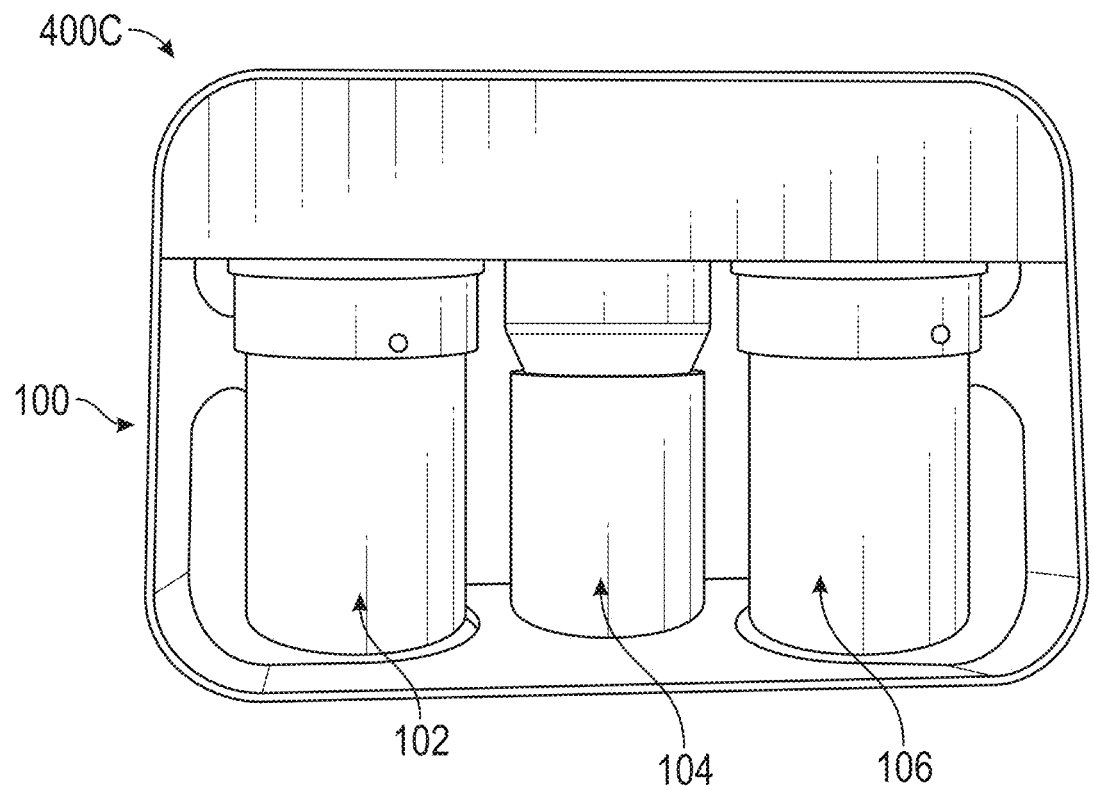

FIGS. 6A, 6B, and 6C illustrate another exemplary housing 400C configured to retain and support the filters 102, 106 and fluid pump 104 of a filter apparatus 100. While not shown in FIGS. 6A-6C, the housing 400C could also be used for retaining and supporting a filter/disinfector apparatus 300. The housing 400C also retains and supports a controller for controller the filters 102, 106 and fluid pump 104. Like FIG. 5, the housing 400C may also include a control panel (not shown) that is communicatively coupled to the controller 110 such that a user may control the operation of the filter apparatus 100. The housing 400C also includes a power port so that a power source 210 may be coupled to the filter apparatus 100 (see FIG. 7). FIGS. 6A and 6B illustrate an exemplary inlet 101a and outlet 101b directly coupled to filters 102, 106. As discussed herein, the inlet 101a and outlet 101b include quick-disconnects for rapid and reliable coupling and uncoupling of hoses to the filter apparatus 100 or the filter/disinfector apparatus 300 (as illustrated in FIGS. 2A and 2B, for accessing a water source 202 and supplying filtered water to a destination 204).

As illustrated in FIGS. 6A-6C, the filters 102, 106 and fluid pump 104 include stainless steel housings. In one embodiment, the filters 102, 106 include exemplary stainless steel 5-inch housings for retaining 5-inch filters with selected pore sizes. As discussed herein, the coarse filter 102 includes a filter sufficient to filter sand and sediment, while the fine filter 106 includes a filter sufficient to filter foreign material larger than 1 micron or less, e.g., a 0.2-micron filter. In one embodiment, the in-line length of the filter apparatus 100 from the inlet 101a to the outlet 101b is 12 inches (see FIG. 10A).

Figure 7:
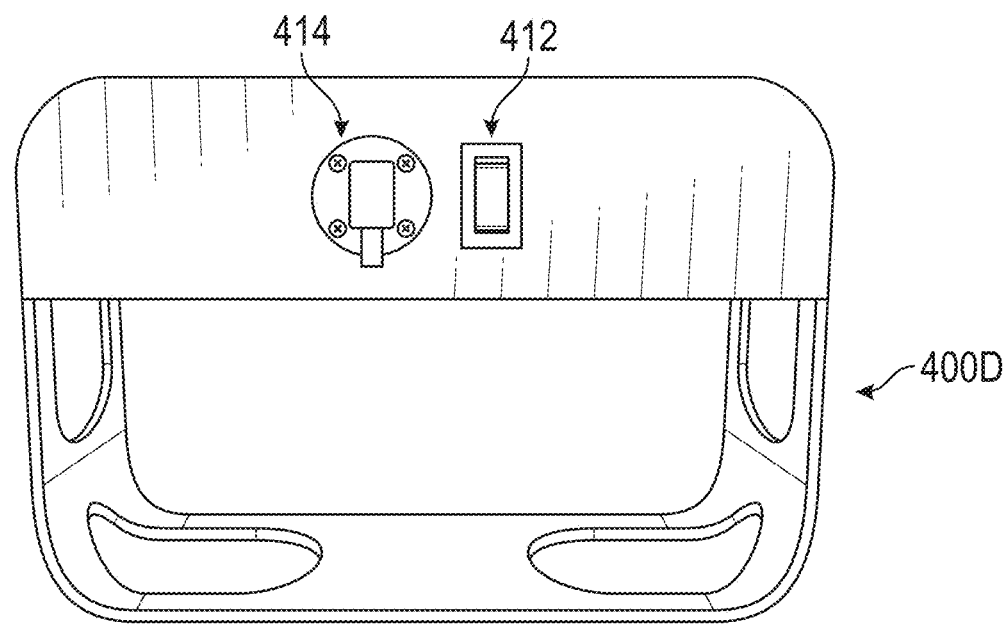
FIG. 7 is a perspective view of an exemplary housing illustrating an exemplary power port and ON/OFF switch in accordance with the present invention.

As illustrated in FIGS. 2 and 7, an exemplary housing 400 includes a power port 414 for receiving a power cable from a power source 210. The power port 414 includes, for example, 10 AWG electrical contacts for coupling a power cable to the filter apparatus 100, or the filter/disinfector apparatus 300.

Figure 8A:
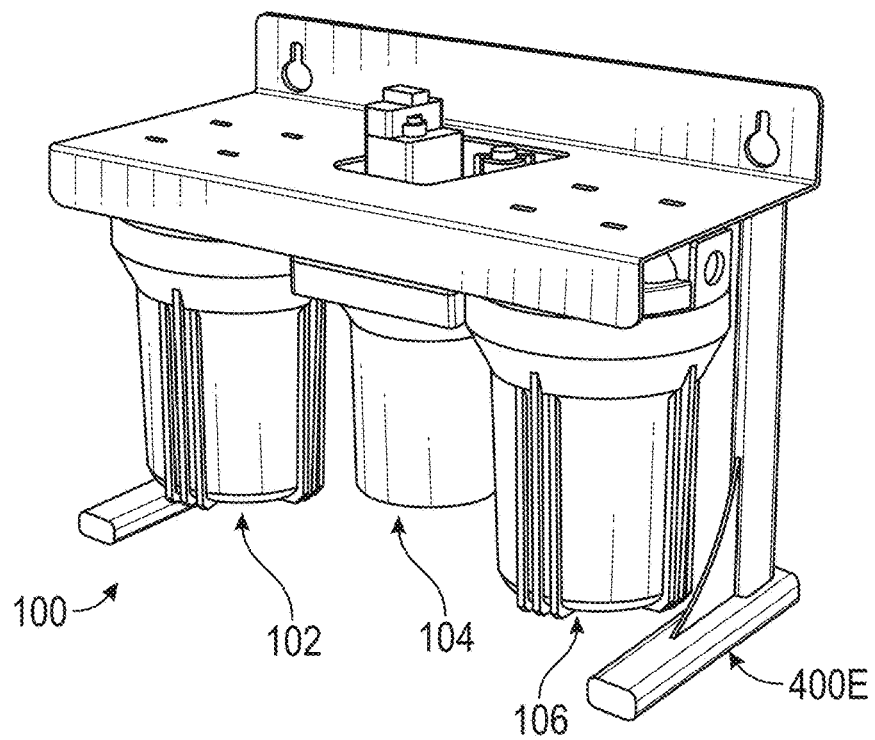
FIGS. 8A and 8B are perspective views of exemplary water filter systems mounted in alternative housing fixtures configured for mounting in accordance with the present invention.
Figure 8B:
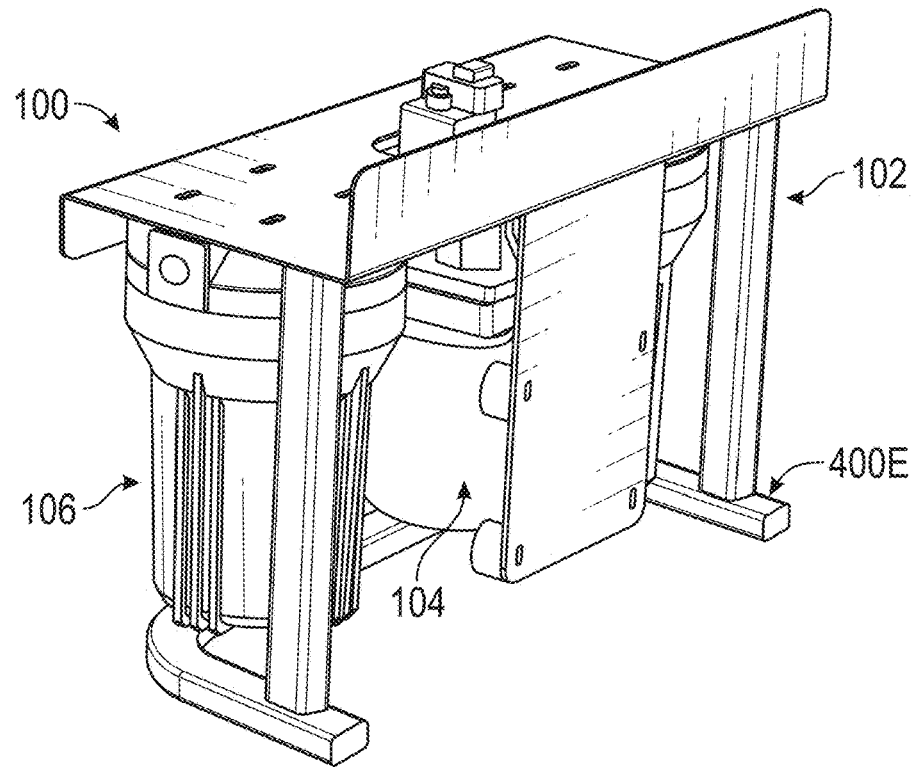

FIGS. 8A and 8B illustrate exemplary housings 400D and 400E, respectively, for securely mounting a filter apparatus 100, or a filter/disinfector apparatus 300 in, for example, a structure (e.g., residential building or similar structure) or a vehicle (e.g., a recreational or utility vehicle). As illustrated in FIGS. 8A and 8B, the housings 400D and 400E are configured with mounting points.

Figure 9A:
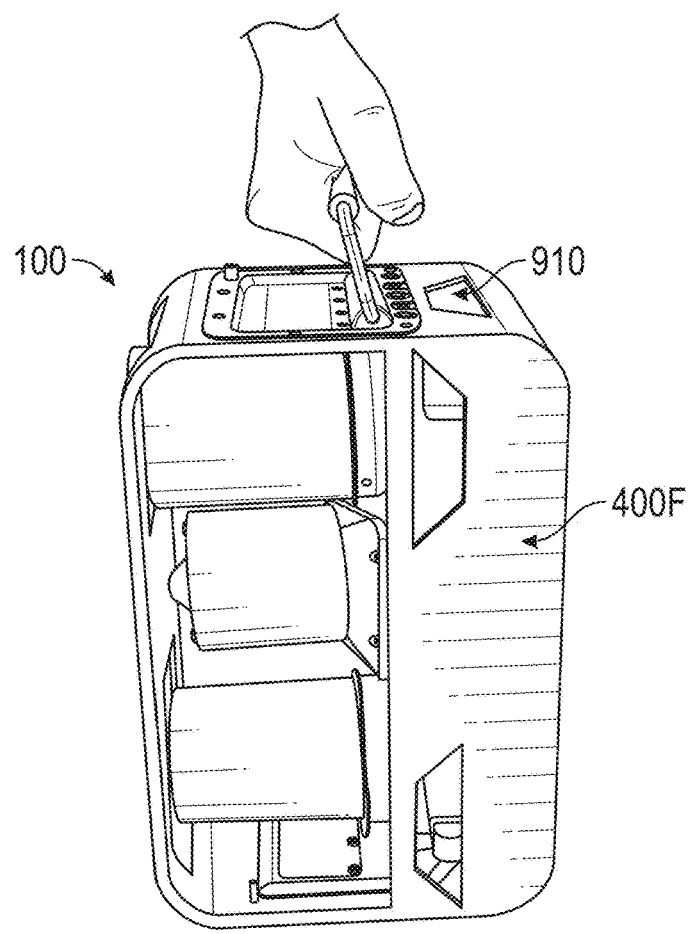
FIGS. 9A and 9B are perspective views of an exemplary water filter system mounted in an alternative housing configured for portability in accordance with the present invention.
Figure 9B:
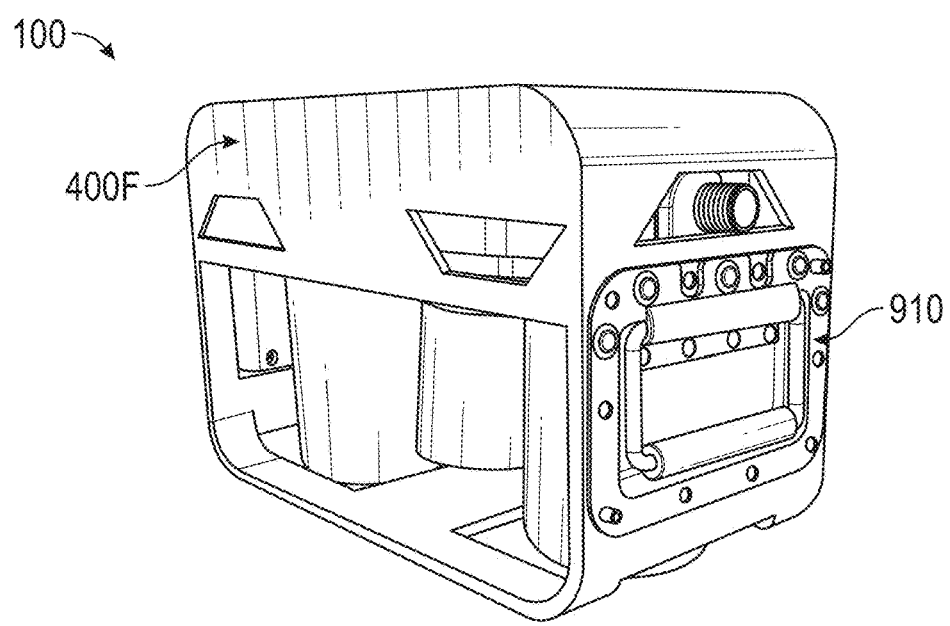

FIGS. 9A and 9B illustrate an exemplary housing 400F that includes one or more handles 910 for improving the portability of the filter apparatus 100 or the filter/disinfector apparatus 300.

Figure 21:
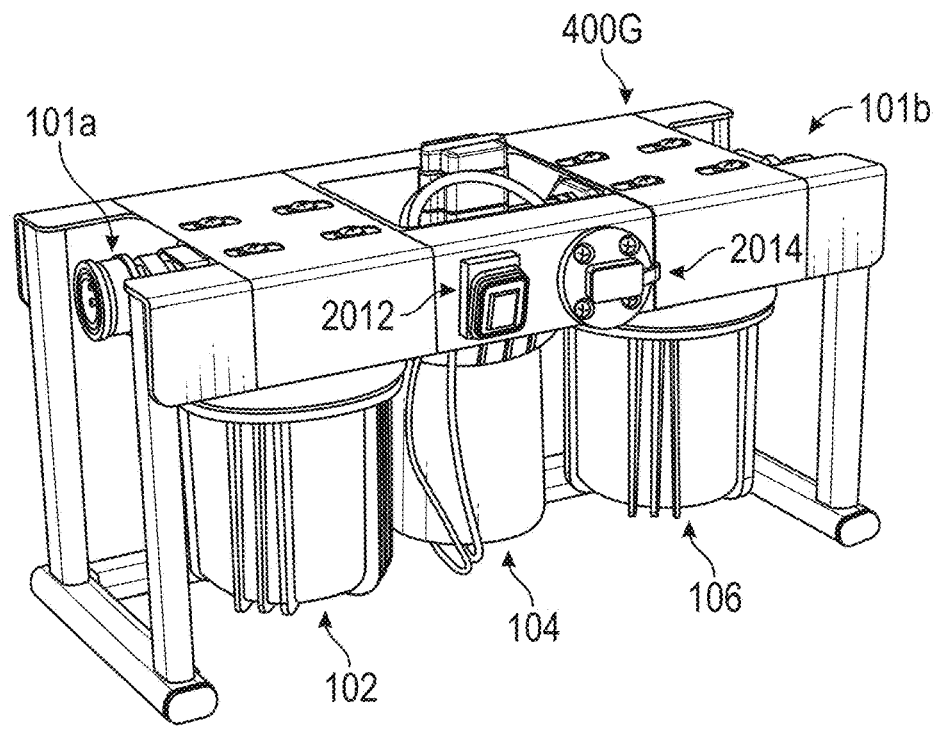
FIG. 21 is another perspective view of the water filter system of FIG. 20 without the battery module and battery in accordance with the present invention.

FIGS. 20 and 21 illustrate an exemplary housing 400G that includes an exemplary battery module 1630 (with battery 1612) for coupling the battery 1612 to the filter apparatus 100 or filter/disinfector apparatus 300. The housing 400G of FIG. 20 is also configured to retain the filters 102, 106 (of a two-stage water filtration system) and the fluid pump 104. As illustrated in FIG. 20, the battery module 1630 is mounted on the housing 400G, and a cable of the battery module 1630 is configured to connect the battery 1612 to the filter apparatus 100, 300 via an electrical receptacle 2014 of the filter apparatus 100, 300. As illustrated in FIGS. 20 and 21, the housing 400G also includes an ON/OFF switch 2012 and associated wiring to the pump 104. FIG. 21 illustrates the housing 400G of FIG. 20 without the battery module 1630.

Figure 22:
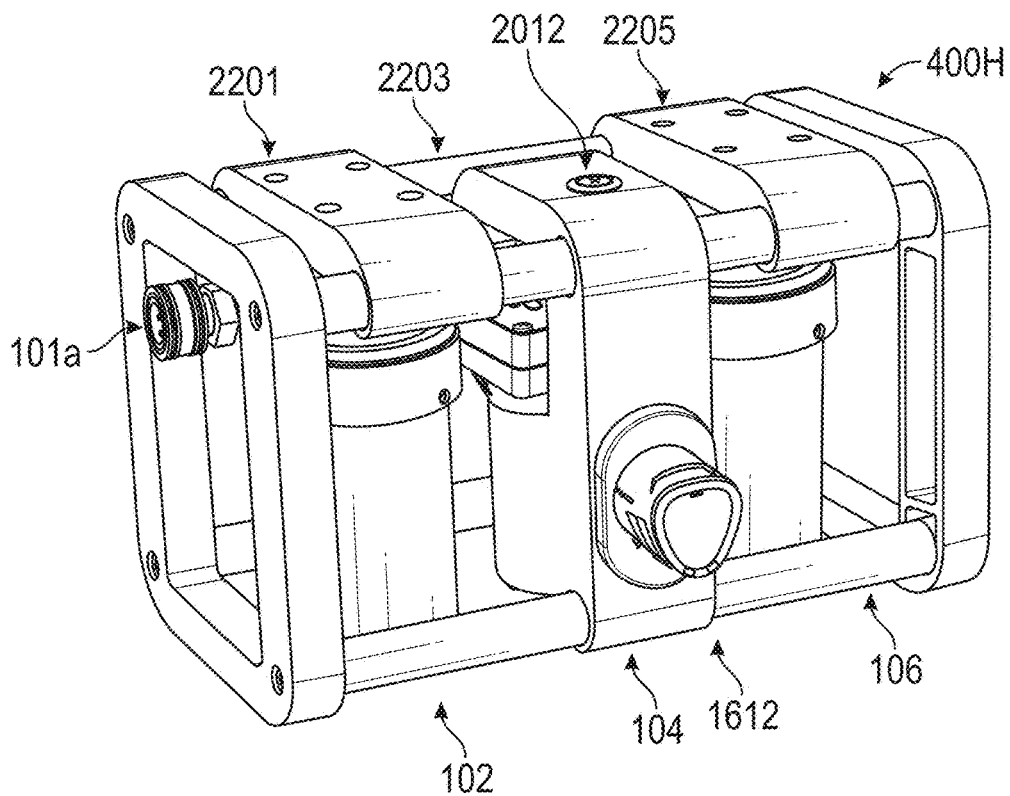
FIG. 22 is a perspective view of an exemplary water filter system with a battery interface for receiving a rechargeable battery in accordance with the present invention.

FIG. 22 illustrates an exemplary housing 400H that includes an electrical receptacle for a battery (e.g., battery 1612). As illustrated in FIG. 22, the housing 400H retains filters 102, 106 and the fluid pump 104. The housing 400H also includes an ON/OFF switch 2212. The housing 400H also includes brackets 2201 and 2205, and 2203 for securing the filters 102 and 106 (of a two-stage water filtration system) and the fluid pump 104, respectively, into the housing 400H. FIG. 22 also illustrates the inlet coupler 101a on one side of the housing 400H.

Figure 19:
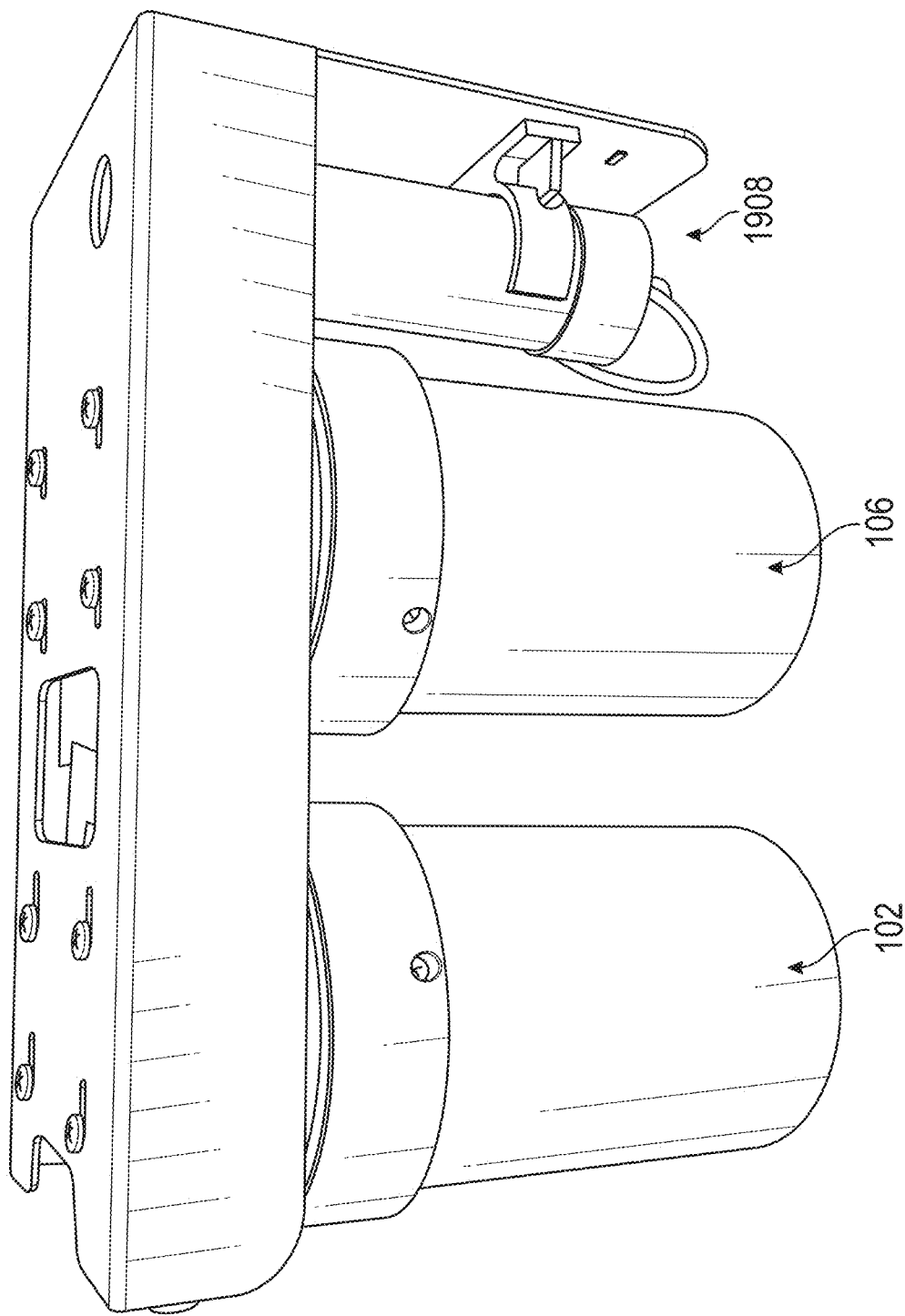
FIG. 19 is a perspective view of an exemplary water filter system with UV disinfection in accordance with the present invention.

FIG. 19 illustrates an exemplary arrangement of a pair of filters 102, 106 and a UV disinfection unit 1908. As discussed herein, the water filter arrangement of FIG. 19 may be used with an external water pump for drawing into, or pulling water through, the filters 102, 106 and UV disinfection unit 1908 of FIG. 19.

Figure 18A:
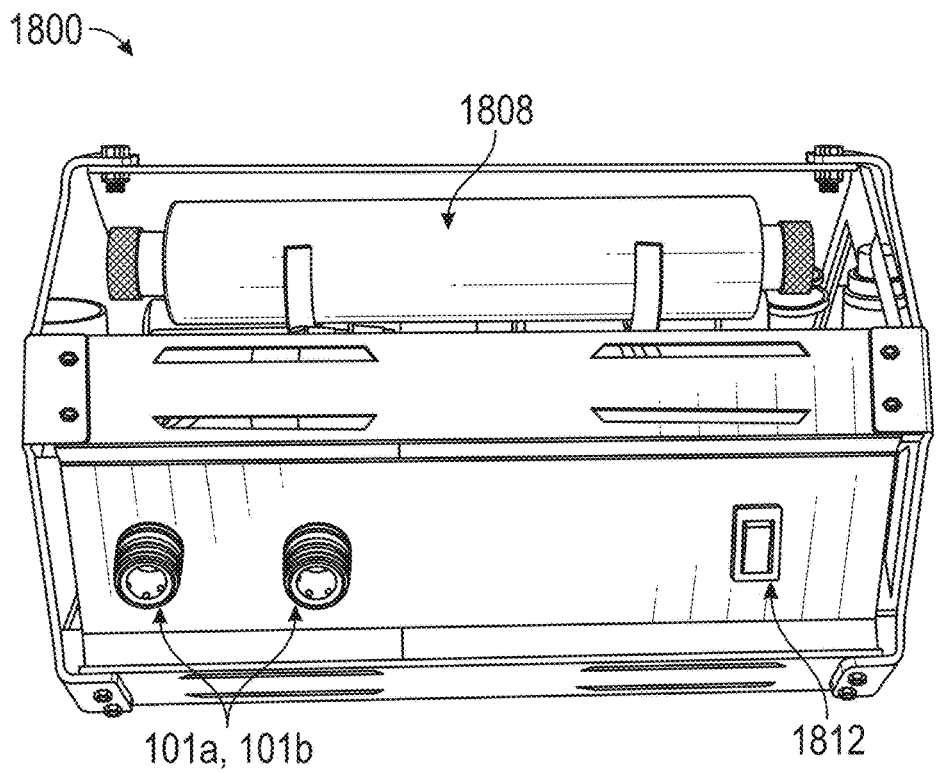
FIGS. 18A and 18B are different perspective views of an exemplary water filter system with UV disinfection in accordance with the present invention.
Figure 18B:
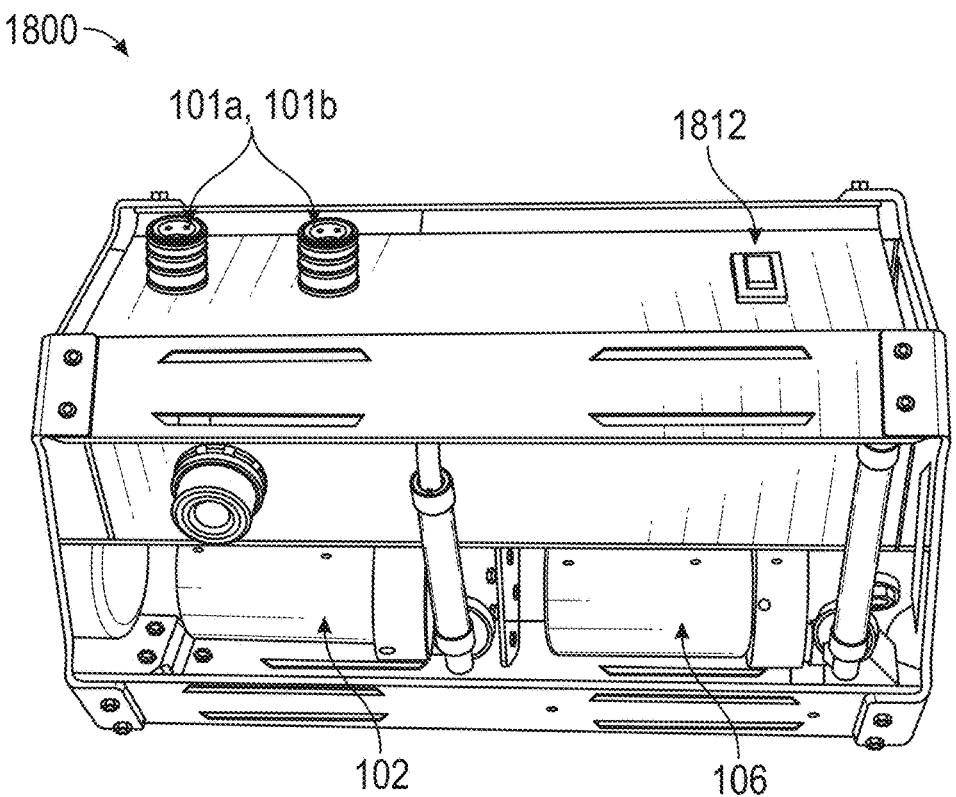

FIGS. 18A and 18B illustrate an exemplary water/disinfector apparatus 1800 with a pair of water filters 102, 104 for a two-stage water filtration system, a UV disinfection unit 1808, and water inlet/outlets 101a, 101b. The chassis or housing of the water/disinfector apparatus 1800 also includes an ON/OFF button 1812.

The filter apparatus 100 and filter/disinfector apparatus 300 discussed herein may be used in a variety of uses. For example, the filter apparatus 100 or filter/disinfector apparatus 300 may be used to supply filtered and/or disinfected water to a recreational vehicle. Such use may also allow for the filter apparatus 100 or filter/disinfector apparatus 300 to be removeable and used in a portable fashion (in combination with a power source 210 and/or solar panel 220). In other words, the filter apparatus 100 or filter/disinfector apparatus 300 may be used in off-grid water filtration/disinfection situations (with the fluid pump 104 supplying 2-3 gallons of filtered/disinfected water a minute). When installed in a vehicle or in a portable configuration, the filter apparatus 100 or filter/disinfector apparatus 300 may be delivered to a location in need of filtered and disinfected water (such as after a natural disaster or other similar occurrence that has disrupted the supply of clean water). An advantage of the filter apparatus 100 or the filter/disinfector apparatus 300 over other water filters or water disinfectors is that the embodiments described herein are powered by low voltage DC and may be powered via batteries or suitable solar panels. Thus, the filter apparatus 100 or the filter/disinfector apparatus 300 may be used in locales (in need of clean water) with a shortage of reliable power.

Figure 10A:
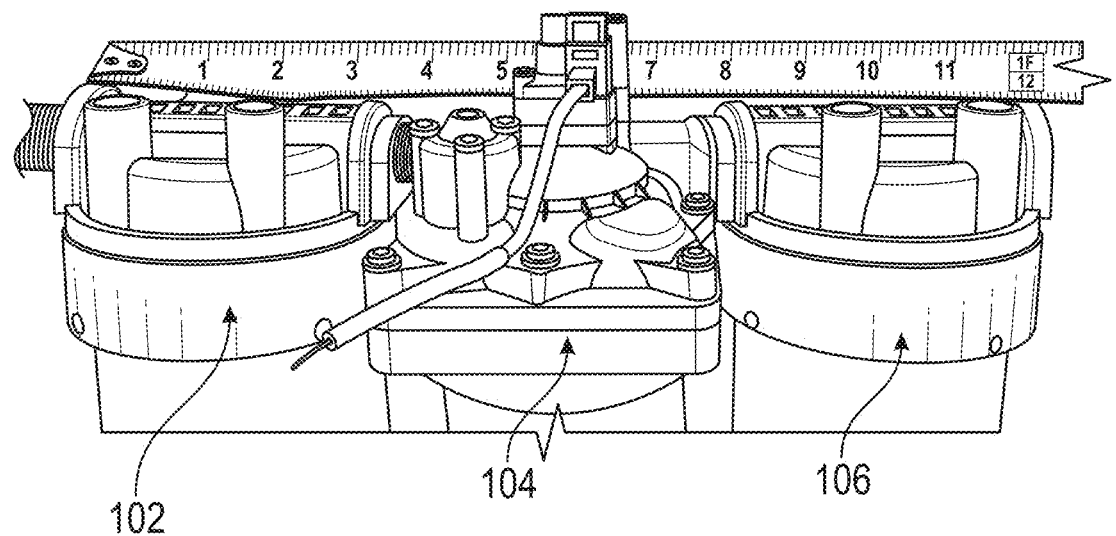
FIGS. 10A and 10B are perspective views of the direct coupling between the filters and pump of exemplary water filtration systems in accordance with the present invention.
Figure 10B:
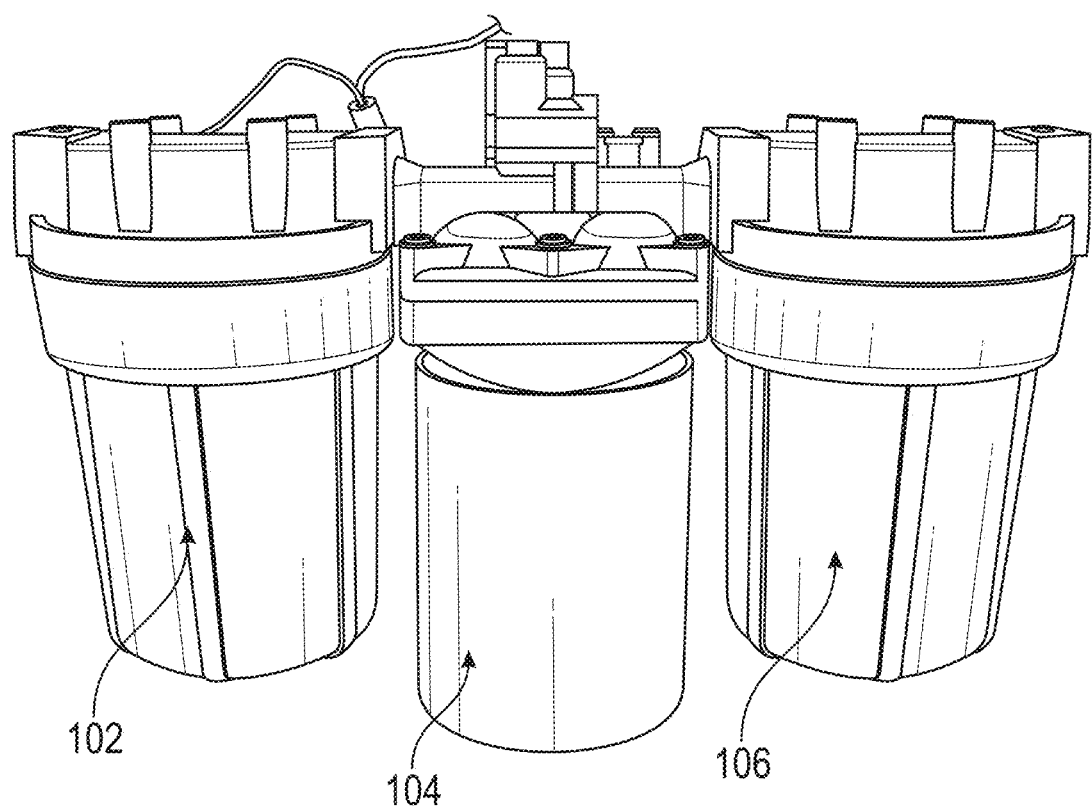

FIGS. 10A and 10B illustrate the direct coupling of filters (102, 106) and pumps (104) of a pair of exemplary water filtration apparatuses. FIGS. 10A and 10B provide close up views of filter 102 directly coupling to pump 104, and with pump 104 directly coupling to filter 106. By directly coupling the filters and pump together (as well as directly coupling the quick-connect inlet and outlet to the filters), the resulting water filtration apparatuses of FIGS. 10A and 10B are assembled without the need for intermediary conduits or couplers between the filters and pump.

Figure 12:
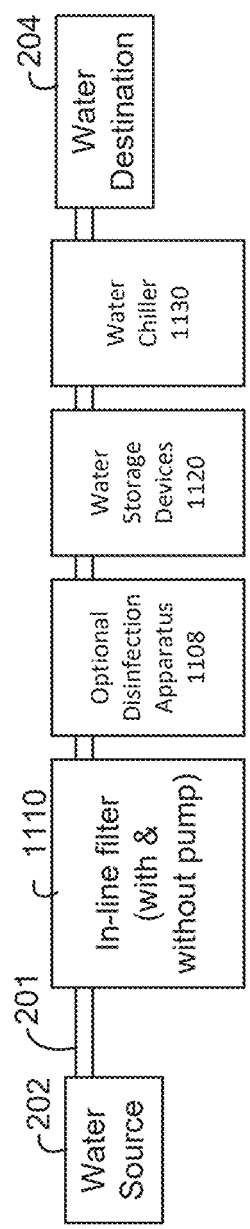
FIG. 12 is a block diagram of an exemplary arrangement of the components of the water filter system of FIG. 11.

FIGS. 11 and 12 illustrate the incorporation of additional optional components into an exemplary water filtration system 1100. The water filtration system 1100 includes a water filter 1110, a disinfection apparatus 1108 suitable for UV treatment of water, a water storage tank (water tank) 1120, and a water chiller 1130. FIG. 11 illustrates a variety of different water filters 1110. For example, the water filter 1110 may be implemented as a single filter 1112, a dual filter 1114, and a triple filter 1116. The single, dual, and triple filters 1112, 1114, and 1116 are intended for filtering water received from a pressurized water source. When the water received for filtering comes from a non-pressurized source, a filter system with an integrated pump 100 may be used. As discussed herein (see FIGS. 1-3), the water filtration system 1100 with integrated pump may include one or more filters. The water filtration system 1100 may also include a disinfection apparatus 1108 for UV treatment of the water.

As illustrated in FIG. 12, the water filtration system 1100, when incorporating the disinfection apparatus 1108, may implement the disinfection apparatus 1108 as either a stand-alone unit that receives water from the water filter 1110 or is integrated into a single housing (see FIGS. 1-3 and disinfection apparatus 308). While FIG. 12 illustrates a water filtration system 1100 with a water filter 1110, a disinfection apparatus 1108, a water storage device (water tank) 1120, and a water chiller 1130 in a particular arrangement, the components of the water filtration system 1100 may be arranged in any order. Optionally any of the components may be omitted from the water filtration system 1100. For example, a water pump 104 may be omitted from the water filter 1100, placed in-line in another position within the water filtration system 1100, or omitted entirely when pressurized water is received for filtration.

FIG. 11 illustrates a variety of different water tanks or water storage tanks 1120. Such water tanks 1120 may include flexible storage tanks, insulated storage tanks, and hard-sided storage tanks. Optionally the water tank 1120 and water chiller 1130 may be incorporated into a single unit or combined into a single housing. Just as more than one water filter may be incorporated into the water filter 1110, one or more disinfection apparatuses 1108, water chillers 1130, or water tanks 1120 may be incorporated into embodiments of the water filtration system 1100. For example, the water source 202 may come from a first water tank 1120 and with the water destination 204 including a second water 1120. Optionally, the water filtration system 1100 may incorporate a third water tank 1120 containing filtered and disinfected water (either chilled or ready for chilling). Thus, possible embodiments of the exemplary water filtration system 1100 may be implemented in any configuration and to include or omit any of the components.

Figure 13:
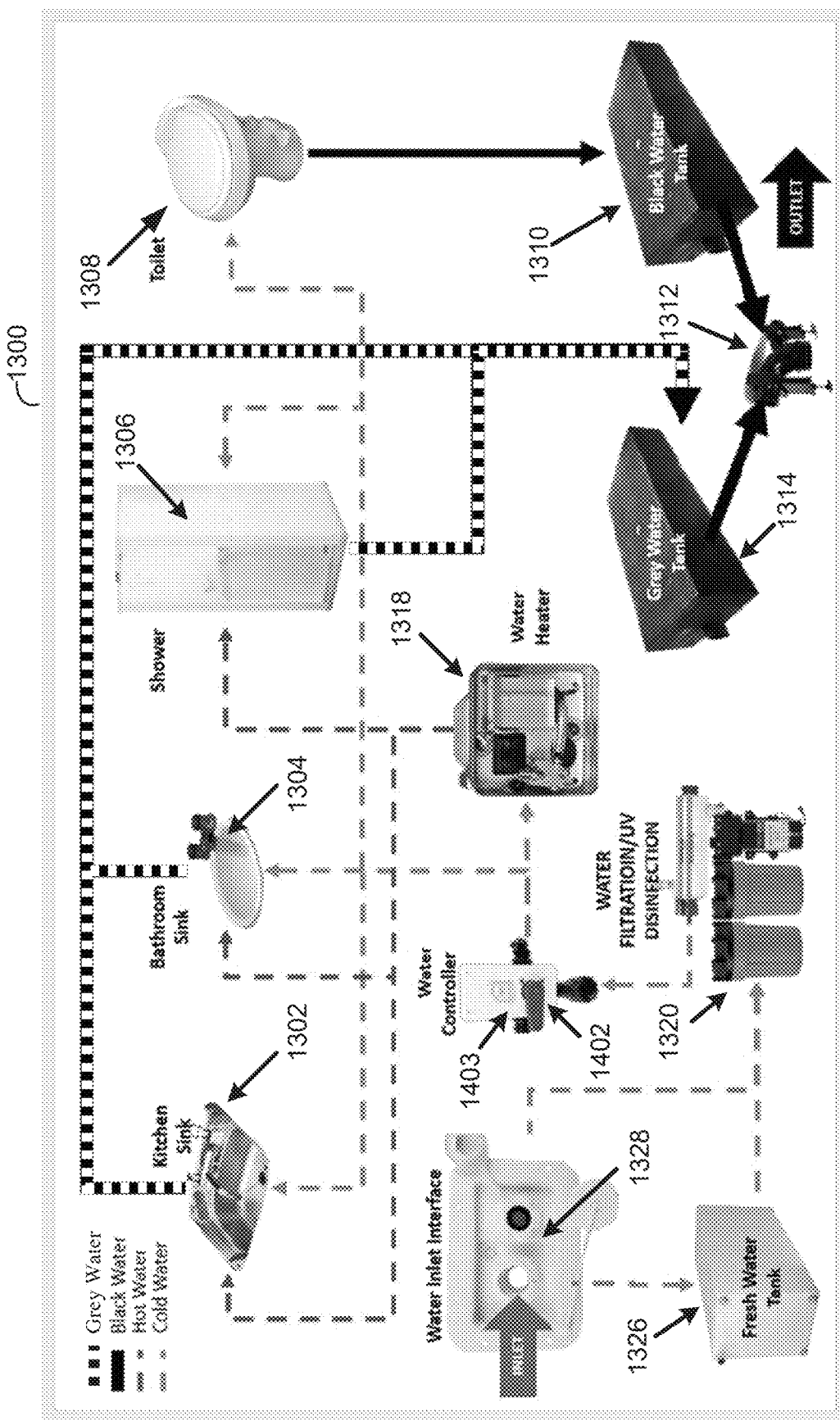
FIG. 13 is a block diagram of an exemplary water filter system as part of a water and wastewater system in accordance with the present invention.

FIG. 13 illustrates an exemplary water and wastewater system 1300. The water and wastewater system 1300 may be used in a recreational vehicle (RV), a temporary structure, a permanent structure, or other facility or accommodation. Other uses of such a water and wastewater system 1300 are also anticipated, such as, providing water and wastewater management at events or at locations in need of temporary water/wastewater services. As illustrated in FIG. 13, the water and wastewater system 1300 includes a water filtration/UV disinfection module 1320 for filtering and disinfecting water that is supplied within an associated RV, house, or structure. As discussed herein, the water filtration/UV disinfection module (hereinafter referred to as a filter/UV module) 1320 may also include a water pump. Alternatively, the water pump may be separate device that pumps water to the filter/UV module 1320 (or alternatively draws water through the filter/UV module 1320). In further alternative embodiments, the water filtration module is only a two-stage water filtration system (lacking the UV disinfection apparatus).

Figure 14:
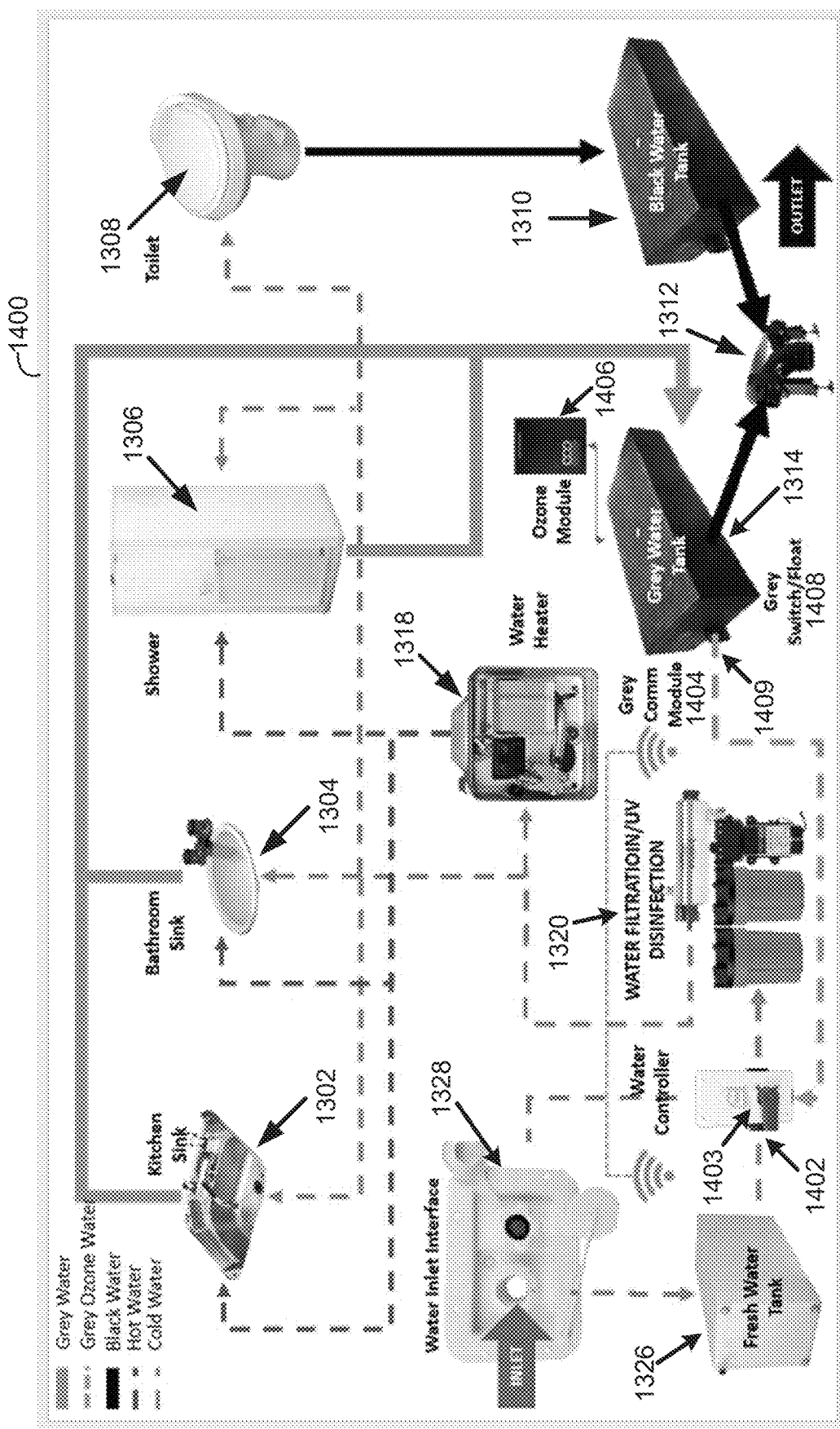
FIG. 14 is a block diagram of an exemplary water filter system as part of a recycling water and wastewater system in accordance with the present invention.

As illustrated in FIG. 13, water is received via a water inlet interface 1328, which supplies water to a freshwater tank 1326 and the filter/UV module 1320. In one exemplary embodiment, the output of filtered and disinfected water from the filter/UV module 1320 is controlled by a water controller 1402. As illustrated In FIG. 14, in a further embodiment, the water controller 1402 is configured to control the flow of fresh and treated grey water into the filter/UV module 1320 (via a valve 1403). Water from the filter/UV module 1320 is supplied to the water heater 1318, such that both cold and hot water may be provided to one or more sinks in the structure, vehicle, or accommodation. For example, hot and cold water is supplied to an exemplary kitchen sink 1302, a bathroom sink 1304, a shower 1306, and a toilet 1308. While single sinks, showers, and toilets are illustrated in FIG. 13, other arrangement are possible. For example, multiple kitchen sinks 1302 could be arranged. Similarly, the hot and cold water could be provided to the bathroom sinks 1304, showers 1306, and toilets 1308 of multiple bathrooms.

Gray water draining from the kitchen sink 1302, bathroom sink 1304, and the shower 1306 are piped to a grey water tank 1314. Similarly, black water from the toilet 1308 is piped to a black water tank 1310. As illustrated in FIG. 13, the grey water tank 1314 and the black water tank 1310 are connected to a valved outlet 1312 which controls the outputs of the grey water tank 1314 and the black water tank 1310.

FIG. 14 illustrates an exemplary water recycling system 1400. Similar to the water and wastewater system 1300 of FIG. 13, the water recycling system 1400 of FIG. 14 filters water for delivery to sinks, showers, toilets, and such water sources. However, unlike FIG. 13, the water recycling system 1400 of FIG. 14 additionally includes a grey water communication module 1404 and an ozone module 1406. Furthermore, the water controller 1402 is repositioned to control the flow of water into the filter/UV module 1320.

The ozone module 1406 is configured to release ozone which is used to treat the water in the grey water tank 1314 (the water from the kitchen sink 1302, bathroom sink 1304, and the shower 1306). A switch/float 1408 in the grey water tank 1314 opens and closes a valve 1409 based upon the level of grey water in the grey water tank 1314. When the valve 1409 is opened, the grey water flows to the water controller 1402. As illustrated in FIG. 14, the grey communication module 1404 sends a signal to the water controller 1402 when the switch/float 1408 opens the valve. Receiving the signal, the water controller 1402 opens a valve 1403 within the water controller 1402 allowing the treated water to flow to the filter/UV module 1320. Shifting the valve 1403 to allow the treated water to flow also shuts off the water from the water inlet 1328 and the freshwater tank 1326. Thus, the valve 1403 is sued to control the flow of water (or treated water) into the filter/UV module 1320.

Via the grey communication module 1404, the water controller 1402 controls the operation of the switch/float 1408 and valve 1409 of the grey water tank 1314 and the ozone module 1406. For example, the water controller 1402 can selectively turn off the ozone module 1406 and close the valve 1409 regardless of the quantity of grey water in the grey water tank 1314. The water controller 1402 is also configured to selectively supply water from the freshwater tank 1326 and/or the water inlet 1328 (via the internal valve 1403) to the filter/UV module 1320.

Thus, a mobile filter/disinfecting system provides mobile water filtering and disinfection. The mobile filter/disinfecting system is powered via a low-voltage DC power source. The filter/disinfection system includes a filtering apparatus that includes at least one filter and a pump. The filter/disinfection system also optionally includes a disinfection apparatus that includes a UV light fixture for disinfecting water as the water passes through the disinfection apparatus. The filter/disinfection system includes a controller for turning the pump ON and OFF. The controller also turns the UV light fixture ON and OFF. The controller controls the selective delivery of a DC voltage to the pump and the UV light fixture. The pump and UV light fixture may utilize a same voltage level, e.g., 12 VDC. The DC voltage is drawn from a power source that is plugged into the filter/disinfection system. Optionally, the power source is a battery (either internal or external). The power source may also include an AC-to-DC converter that outputs a DC voltage. The power source outputs a current sufficient to power both the pump and the UV light fixture. The controller may turn ON the pump while leaving the UV light fixture OFF. The power source is also configured to couple to a solar panel for charging. The use of a solar panel and battery allows for the portable use of the filter/disinfection system away from conventional power sources. The mobile filter/disinfecting system may optionally include a water tank and/or a water chiller. The components of the mobile filter/disinfecting system may include any combination of components as well as including or omitting any components. The components of the mobile filter/disinfecting system may be arranged in any desired configuration. The filter/disinfecting system may also be arranged in a permanent or semi-permanent housing for incorporation into a water and wastewater system for a vehicle, structure, or other use that necessitates at least a semi-permanent water and wastewater handling system. The filter-disinfection system thus provides filtered water for use in sinks, showers, and toilets. Optional embodiments also provide for recycling of grey water for reuse.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A water filtration system comprising:
   a coarse filter configured to filter sand/sediment from water fed to the coarse filter;
   a fine filter configured to filter water passing through the coarse filter, wherein the fine filter is configured to filter out foreign material larger than a selected filter pore size;
   a fluid pump configured to pump water when a DC voltage is selectively applied to the fluid pump, wherein the fluid pump is positioned in-line with respect to the coarse filter and the fine filter such that the fluid pump either draws or pushes water into the coarse filter or draws or pushes water into the fine filter;
   an inlet connector directly coupled to the coarse filter and configured to allow water to enter the coarse filter;
   an outlet connector configured to output filtered water received from the fine filter to one or more sinks, showers, and toilets;
   a grey water tank configured to receive and store grey water, wherein the grey water tank and at least one of the one or more sinks and showers is coupled via a grey water line;
   an ozone module configured to produce ozone for treating the grey water in the grey water tank to produce treated grey water;
   a water controller configured to selectively couple the treated grey water from the grey water tank to the coarse filter via the inlet connector; and
   a power source communicatively coupled to the fluid pump and configured to output the DC voltage applied to the fluid pump.

2. The water filtration system of claim 1, wherein the selected filter pore size is smaller than 0.2 microns in diameter.

3. The water filtration system of claim 1, wherein the power source is a battery.

4. The water filtration system of claim 3 further comprising a recharging unit configured to recharge the battery, wherein the recharging unit receives power from an external power source configured to output voltage to the recharging unit.

5. The water filtration system of claim 1, wherein the power source comprises an AC-to-DC converter.

6. The water filtration system of claim 1, wherein the fluid pump is a diaphragm pump configured to pump at least 2 gallons a minute, and wherein the fluid pump draws 1.5 to 10 amps when pumping.

7. The water filtration system of claim 1 further comprising a disinfection apparatus comprising an ultraviolet (UV) light fixture configured to disinfect the filtered water as it passes through the disinfection apparatus, wherein the UV light fixture is energized when the DC voltage is selectively applied to the UV light fixture, wherein the disinfection apparatus is directly coupled between the fine filter and the outlet, and wherein the disinfection apparatus further comprises a flow switch configured to selectively energize the UV light fixture in response to detecting the flow of water through the disinfection apparatus.

8. The water filtration system of claim 1, wherein the inlet connector and the outlet connector are quick-connect connectors and are configured to receive water hoses for reaching a water source and a water destination, respectively.

9. The water filtration system of claim 1 further including at least one of a water tank, a water heater, and a water chiller.

10. The water filtration system of claim 1 further comprising a frame or housing unit configured to retain and support the coarse filter, fine filter, and fluid pump, and wherein the frame or housing unit is configured to integrate the water filtration system into a water and wastewater system configured to supply water to the one or more sinks, showers, and toilets, and to handle wastewater from the one or more sinks, showers, and toilets, wherein the water and wastewater system comprises a black water tank, the grey water tank, and the ozone module, wherein the black water tank is configured to receive and store black water, and wherein the black water tank and the one or more toilets are coupled via a black water line.

11. The water filtration system of claim 7 further comprising a frame or housing unit configured to retain and support the coarse filter, fine filter, fluid pump, and disinfection apparatus, and wherein the frame or housing unit is configured to integrate the water filtration system into a water and wastewater system configured to supply water to the one or more sinks, showers, and toilets, and to handle wastewater from the one or more sinks, showers, and toilets, wherein the water and wastewater system comprises a black water tank, the grey water tank, and the ozone module, wherein the black water tank is configured to receive and store black water, and wherein the black water tank and the one or more toilets are coupled via a black water line.

12. A water and wastewater handling system configured to supply water in a vehicle or structure, wherein the water and wastewater handling system comprises:
   a plurality of water supply lines comprising a cold water supply line and a hot water supply line, wherein the plurality of water supply lines are configured to supply water to one or more sinks, showers, and toilets arranged within the vehicle or structure;
   a water filtration apparatus comprising at least one filter and a fluid pump, wherein the fluid pump is configured to draw water from a water inlet and into the at least one filter, wherein the at least one filter is configured to filter the water, and wherein the water filtration apparatus is configured to output the filtered water to the plurality of water supply lines;

a grey water tank for receiving and storing grey water, wherein the grey water tank and the at least one or more sinks and showers are coupled via a grey water line;

an ozone module configured to produce ozone for treating the grey water in the grey water tank to produce treated grey water;

a black water tank for receiving and storing black water, where the black water tank and the at least one toilet are coupled via a black water line; and a water controller configured to selectively couple the treated water from the grey water tank to the water inlet of the water filtration apparatus.

13. The water and wastewater handling system of claim 12 comprising a valve configured to control the discharge of grey water and black water via an outlet from the grey water tank and the black water tank, respectively.

14. The water and wastewater handling system of claim 12 further comprising a water heater configured to heat water received from the cold water supply line and to output hot water to the hot water supply line.

15. The water and wastewater handling system of claim 12 further comprising a fresh water tank configured to store water, wherein the water inlet configured to supply water to the fresh water tank, and wherein the water filtration apparatus is configured to draw water from the fresh water tank and/or the water inlet.

16. The water and wastewater handling system of claim 15, wherein the grey water tank comprises a valve switch configured to open when an internal float detects at least a threshold level of the grey water in the grey water tank.

17. The water and wastewater handling system of claim 16, wherein the water controller is configured to control the flow of water into the water filtration apparatus, wherein the water controller, in a first mode, is configured to selectively couple water from either the fresh water tank and/or the water inlet to the water inlet of the water filtration apparatus, and wherein the water controller, in a second mode, is configured to couple the treated water from the valve switch of the grey water tank to the water inlet of the water filtration apparatus.

18. The water and wastewater handling system of claim 17 further comprising a grey water communications module configured to output a signal to the water controller, wherein the water controller is configured to switch between modes based on the signal from the water controller, wherein the grey water communications module is configured to output a discharge signal to the water controller when the valve switch opens in response to the internal float.

19. The water and wastewater handling system of claim 18, wherein the water controller is configured to control the operation of the valve switch of the grey water tank and the ozone module via the grey water communications module.

* * * * *